(12) United States Patent
Fernandez

(10) Patent No.: US 11,893,727 B2
(45) Date of Patent: Feb. 6, 2024

(54) RAIL FEATURE IDENTIFICATION SYSTEM

(71) Applicant: Harsco Technologies LLC, Fairmont, MN (US)

(72) Inventor: Javier Fernandez, Fairmont, MN (US)

(73) Assignee: HARSCO TECHNOLOGIES LLC, Fairmont, MN (US)

( * ) Notice: Subject to any disclaimer, the term of this patent is extended or adjusted under 35 U.S.C. 154(b) by 97 days.

(21) Appl. No.: 17/508,984

(22) Filed: Oct. 23, 2021

(65) Prior Publication Data

US 2022/0189001 A1 Jun. 16, 2022

Related U.S. Application Data

(60) Provisional application No. 63/105,057, filed on Oct. 23, 2020.

(51) Int. Cl.
*G06V 10/56* (2022.01)
*G06T 7/00* (2017.01)
(Continued)

(52) U.S. Cl.
CPC ............. *G06T 7/001* (2013.01); *B61C 13/00* (2013.01); *B61C 17/00* (2013.01); *B61K 9/08* (2013.01); *G06T 7/248* (2017.01); *G06T 7/74* (2017.01); *G06V 10/56* (2022.01); *G06V 10/60* (2022.01); *G06V 10/764* (2022.01); *G06V 10/7747* (2022.01); *G06V 10/82* (2022.01); *G06V 20/56* (2022.01); *H04N 7/183* (2013.01); *H04N 23/56* (2023.01); *H04N 23/90* (2023.01); *G06T 2200/24* (2013.01); *G06T 2207/10024* (2013.01); *G06T 2207/20081* (2013.01); *G06T 2207/20084* (2013.01); *G06T 2207/30204* (2013.01)

(58) Field of Classification Search
CPC .... B61L 23/06; B61L 2205/04; B61L 25/026; B61L 23/34; B61L 15/0027; B61L 25/025; B61L 1/02; B61L 23/042; B61L 23/00; B61L 23/20; B61L 27/57; B61L 27/40; B61L 15/0081; B61L 25/021; B61L 23/044; B61L 23/045; B61L 15/0072
USPC ......................................................... 348/148
See application file for complete search history.

(56) References Cited

U.S. PATENT DOCUMENTS 10,752,271 B2 * 8/2020 Chung .................... B61L 27/40
2004/0263624 A1 * 12/2004 Nejikovsky ........... B61L 23/042
348/148

(Continued)

OTHER PUBLICATIONS

International Search Report and Written Opinion issued in PCT Application No. PCT/US2021/056378, dated Apr. 11, 2022.

*Primary Examiner* — Masum Billah
(74) *Attorney, Agent, or Firm* — Norton Rose Fulbright US LLP

(57) ABSTRACT

The present disclosure includes systems, devices, and methods for identifying, detecting, and/or tracking rail features. In some aspects, a system includes a camera and a computer having at least one memory, at least one processor configured to receive a plurality of images from the camera, and for each of the images: assigning a location identifier and identifying one or more rail features that correspond to one of a plurality of predetermined rail features. In some systems, the at least one processor is configured to determine a location of each of the one or more identified rail features.

19 Claims, 19 Drawing Sheets

(51) Int. Cl.
  *G06T 7/73*      (2017.01)
  *G06T 7/246*     (2017.01)
  *G06V 10/774*    (2022.01)
  *G06V 10/60*     (2022.01)
  *G06V 10/82*     (2022.01)
  *G06V 10/764*    (2022.01)
  *G06V 20/56*     (2022.01)
  *B61C 13/00*     (2006.01)
  *B61C 17/00*     (2006.01)
  *B61K 9/08*      (2006.01)
  *H04N 7/18*      (2006.01)
  *H04N 23/56*     (2023.01)
  *H04N 23/90*     (2023.01)

(56) References Cited

U.S. PATENT DOCUMENTS

| | | | |
|---|---|---|---|
| 2007/0152107 A1* | 7/2007 | LeFebvre | B61K 9/00 |
| | | | 246/169 R |
| 2009/0173839 A1 | 7/2009 | Groeneweg et al. | |
| 2012/0192756 A1* | 8/2012 | Miller | B61L 23/048 |
| | | | 701/19 |
| 2018/0222504 A1* | 8/2018 | Birch | B61L 3/008 |
| 2018/0276494 A1 | 9/2018 | Fernandez | |
| 2020/0070862 A1* | 3/2020 | Bilodeau | B61L 1/02 |
| 2020/0158656 A1* | 5/2020 | Chung | B61L 23/047 |
| 2022/0097746 A1* | 3/2022 | Piparsaniya | B61L 27/70 |

* cited by examiner

SECTION B-B

SECTION B-B

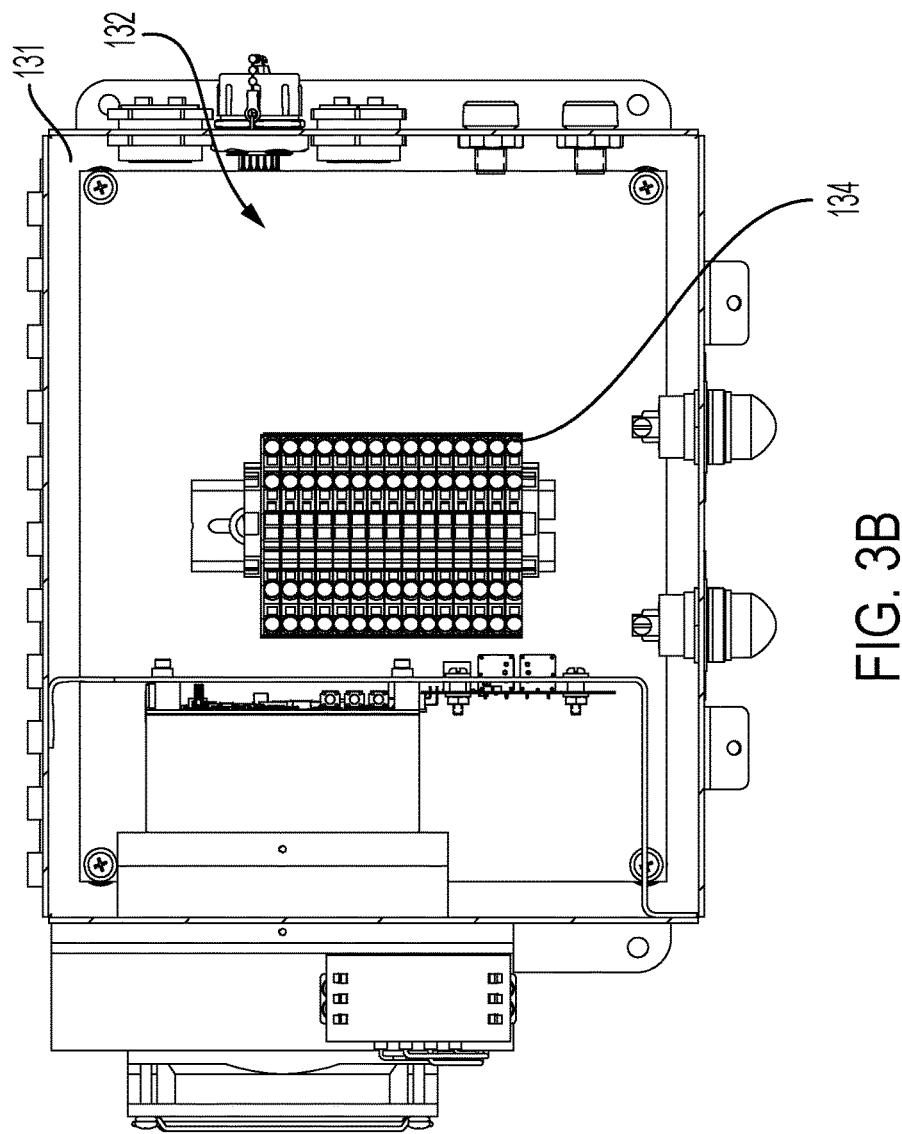
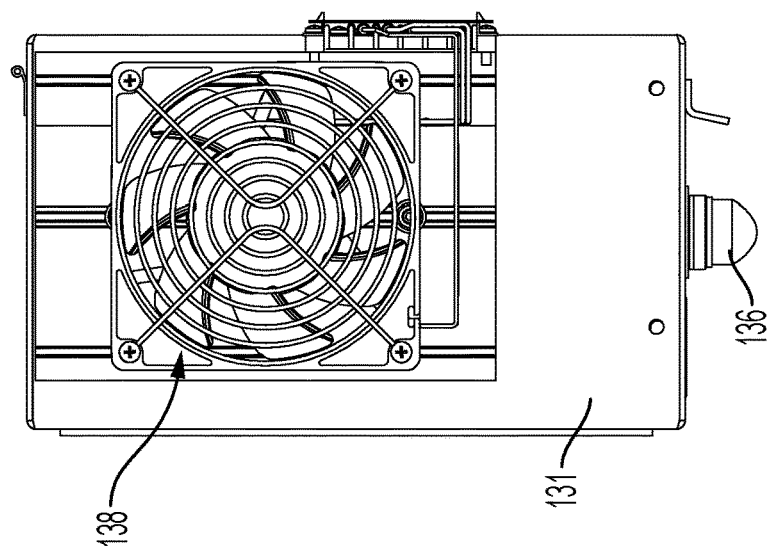
FIG. 3B
FIG. 3A

RAIL FEATURE IDENTIFICATION SYSTEM

CROSS-REFERENCED TO RELATED APPLICATIONS

This application claims the benefit of and priority to U.S. Provisional Application No. 63/105,057, filed Oct. 23, 2020, the contents of which is incorporated into the present application in its entirety.

FIELD OF INVENTION

The present invention relates generally to a rail feature identification system, and more specifically, to an identification and tracking system that utilizes machine learning for identifying rail features and tracking the position of the rail features in real-time.

BACKGROUND

Labor and production rates are among the most important issues in track maintenance programs today. Typical class I maintenance units (e.g., tie renewal or rail replacement gangs) utilize multiple machines, where each machine performs a variety of functions and requires several people to operate. Rising costs and lack of qualified labor has led to a drop in the productiveness of track maintenance. Accordingly, unexperienced or overworked track workers are common and can result in costly mistakes.

SUMMARY

The present disclosure is generally related to systems, devices, and methods that perform object recognition and/or feature identification. For example, the systems, devices, and methods described herein may be used to recognize rail features, color markers, or other components of a rail track. In some configurations, the disclosure may include a rail vehicle having a frame coupled to a plurality of rail wheels configured to move along a rail track and a railroad track feature detection system coupled to the frame. The railroad track feature detection system may include a camera coupled to the frame and positioned such that the camera is configured to capture a plurality of images of a rail track as the rail vehicle moves along the rail track and a computer that includes: at least one memory having instructions and at least one processor configured to execute the instructions. The system may be configured such that the instructions cause the at least one processor to receive the plurality of images, and for each of the images: assign a location identifier to the image; detect one or more rail features in the image; identify the one or more rail features as a relevant rail feature from a dataset of predetermined rail features; and assign a feature identifier to each identified rail feature. In some configurations, based on the location identifier and the feature identifier, the at least one processor may be further configured to determine a geographical location of the one or rail more features and track the one or more rail features.

In some configurations, the instructions include a convolutional neural network. Additionally, or alternatively, the processor may be configured to identify the one or more rail features in real-time. In some configurations the processor is configured to determine if one of the rail features is missing or displaced at a first rail plate and based on the determination that one of the rail features is missing or displaced at the first rail plate, generate an alert signal. Some configurations of the rail vehicle include a work unit coupled to the frame and configured to perform one or more railroad maintenance or operation functions. In some such configurations, the processor is configured to control the work unit to perform a maintenance function at the first rail plate, based on the alert signal.

The rail feature identification system has several advantages over the conventional identification systems in that the system detects features in real-time (e.g., between 10 and 50 milliseconds), the system is trainable to detect any rail feature without changing the software, the system doesn't rely on lasers for 2D measurements, the system can classify up to 600 distinct objects using a Convolutional Neural Network, the system implements an object tracker allowing the system to uniquely identify every feature found with measurements for each identified feature, the system detects color, and the system detect edges among other things. The system digitizes several miles (e.g., up to several hundred miles track) of track features (ties, plates, spikes, anchors and more) in real-time and stores and/or outputs the data to external devices to identify, fix, or record any issues or potential issues associated with the rail track.

Some of the foregoing configurations include a first and second light source. The first and second light source may be coupled to the frame via a first bracket assembly or, in some configurations, can be directly coupled to the frame. The first light source and second light may be coupled to the frame such that the first and second light source are disposed on opposing sides of a first rail of the rail track. In some configuration, the camera is disposed between the first light source and the second light source and configured to take images of the first rail. The camera may include a polarized lenses or one or more polarizing filters. Some of the foregoing configurations include a second camera, a third light source, and a fourth light source. In some such configurations, the frame includes a second bracket assembly and the third light source and fourth light source disposed on the second bracket assembly such that light emitted from the third and fourth light source is directed to opposing sides of a second rail of the rail track. The second camera may be disposed between the third light source and the fourth light source and configured to take images of the second rail.

Some of the foregoing configurations include a railroad track feature detection system. The system may include an imaging device configured to be coupled to a frame of a rail vehicle and positioned such that the imaging device is configured to capture a plurality of images of a rail track as the rail vehicle moves along the rail track and a computer having at least one memory comprising instructions and at least one processor configured to execute the instructions. The at least one processor and the at least one memory may be configured as a neural network. The computer may be configured to perform one or more operations that include receiving the plurality of images, and for each of the images assigning a location identifier and identifying one or more rail features that correspond to one of a plurality of predetermined rail features. The operations may also include determining a location of each of the one or more identified rail features.

Some configurations include additional operations that include assigning a first location identifier to a first image of the plurality of images and identifying, in the first image, the one or more rail features. Other operations include assigning a second location identifier to a second image of the plurality of images, comparing the first location identifier with the second location identifier to determine a first displacement distance between the identified rail features in the first image, and based on the first displacement distance, determining if one or more rail features in the second image correspond to one of the one or more identified rail features in the first image. Based on the determination that a first subset of the one or more rail features in the second image correspond to at least one of the one or more identified rail features in the first image, the computer may set the first subset as detected rail features and re-identifying the first subset of rail features. Additionally, or alternatively, based on the determination that a second subset of the one or more rail features in the second image does not correspond to at least one of the one or more identified rail features in the first image, the computer may set the second subset as detected rail features and identifying, in the first image, the second subset of rail features.

The operations performed by the computer may further include assigning a third location identifier to a third image of the plurality of images, comparing the third location identifier to the first and second location identifiers to determine a second displacement distance, and based on the second displacement distance, determining if the one or more rail features in the third image corresponds to one of the rail features of the first and second subsets. Based on the determination that the first subset of the one or more rail features is not contained within the third image, the computer may set the first subset of rail features as tracked rail features. Based on the determination that a third subset of the one or more rail features in the third image corresponds to at least one of the one or more identified rail features in the first image or the second image, the computer may re-identify the third subset of rail features. Based on the determination that a fourth subset of the one or more rail features in the third image does not correspond to at least one of the one or more identified rail features in the first and second images, the computer may identify, in the third image, the fourth subset of rail features. In some configurations, identifying one or more rail features includes identifying a rail plate, a hole defined by the rail plate, a colored marker disposed on a portion of the rail, an anchor, a work tie, and/or a joint bar.

In some of the foregoing configurations, the computer includes an object detector module, a color detector module, and a tracker module. Each of the object detector module, the color detector module, and the tracker module may be associated with at least one of the one or more processors. In some configurations, the object detector module is configured to receive the plurality of images, detect, in real-time, one or more objects in a latest image of the plurality of images, classify a first set of the one or more objects as one of the one or more rail features, classify a second set of the one or more objects as extraneous features, and/or output the one or more rail features. The object detector module may include, or be configured as a convolutional neural network. In some configurations, the color detector module is configured to receive the plurality of images, determine a hue/saturation/value (HSV) of a plurality of pixels within a latest image of the plurality of images, detect, in real-time, one or more color markers in the latest image, and/or output the one or more color markers. In some configurations, the tracker module is configured to receive the one or more rail features from the object detector module, receive the one or more color markers from the color detector module, assign a feature ID to each of the one or more rail features and the one or more color markers, and track a location of each of the one or more rail features and the one or more color markers.

The tracker module can be further configured to generate a map of the rail track including one or more rail features, based on the location of each of the one or more rail features and the one or more color markers, and transmit the map to an external source. In some of the foregoing configurations, the feature ID may include location information, a feature identifier that corresponds to a predetermined rail feature, and a confidence score. In some configurations, for each image of the plurality of images, the tracker module is configured to record the feature IDs associated with the one or more rail features and the one or more color markers within the image, update an output list to include the feature IDs of a most recent image, and annotate the image. Annotating the image may include adding, to the image, a frame around each of the one or more rail features and the one or more color markers within the image, a ID number associated with the feature ID of the one or more rail features and the one or more color markers within the image, and/or a confidence score associated with the feature ID of the one or more rail features and the one or more color markers within the image. In some such configurations, the tracker module is configured to transmit the annotated image to an external device.

Some of the disclosed systems or devices may be used to track one or more rail features. Some methods of tracking the one or more rail features may include receiving a first image from a camera module, detecting one or more first rail features in the first image, and identifying the one or more first rail features. The method may further comprise receiving a second image from the camera module, calculating a displacement distance associated with the first and second images, detecting one or more second rail features in the second image, based on the displacement distance, identifying a first subset of the one or more second rail features that correspond to one of the one or more first rail features, and re-identifying the first subset of the one or more second rail features. Some of the foregoing methods include the steps of identifying a second subset of the one or more second rail features that do not correspond to one of the one or more first rail features, identifying a first subset of the one or more first rail features that are not included in the second image, and setting the first subset of the one or more first rail features as tracked feature and transmitting feature data of the tracked features to a display unit.

Some such methods include receiving a third image from a camera module, detecting one or more third rail features in the third image, and calculating a second displacement distance associated with the third image and the first and second images. Some methods include, based on the displacement distance, identifying a first subset of the one or more third rail features that correspond to one of the one or more first rail features or one of the one or more second rail features, re-identifying the first subset of the one or more third rail features, and identifying a second subset of the one or more second rail features that do not correspond to one of the one or more first rail features or one of the one or more second rail features.

In some configurations the systems and devices may be configured to perform a method of identifying rail features using machine learning. Some such methods include obtaining, by one or more processors, first image data corresponding to database of a plurality of images of a rail track having one or more rail features; performing, by the one or more processors, object detection on at least a portion of the first image data to convert the at least a portion of the first image data to training data; and training, by the one or more processors, one or more machine learning (ML) models based on the training data to configure the one or more ML models to identify predetermined rail features in subsequent image data. In some of the foregoing methods, the predetermined rail features includes a rail, a rail tie, a tie plate, an anchor, a spike, a spike hole defined by the tie plate, a joint bar, and/or a joint bar bolt.

Some methods further comprise the steps of receiving, by the one or more processors, second image data and generating, by the one or more processors, an output that indicates the one or more rail features identified in the second image data by the one or more ML models. Additionally, or alternatively, the method may include initiating, by the one or more processors and based on the output, display of a graphical user interface (GUI) that identifies the one or more rail features. In some such methods, the display of the GUI illustrates an image corresponding to the second image data and, for each identified rail feature, an indication number that corresponds to a respective one of the one or more rail features and/or a confidence score.

As used herein, various terminology is for the purpose of describing particular configurations only and is not intended to be limiting of configurations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "about" as used herein can allow for a degree of variability in a value or range, for example, within 10%, within 5%, or within 1% of a stated value or of a stated limit of a range and includes the exact stated value or range.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed configuration, the term "substantially" may be substituted with "within [a percentage] of" what is specified, where the percentage includes 0.1, 1, or 5 percent. The statement "substantially X to Y" has the same meaning as "substantially X to substantially Y," unless indicated otherwise. Likewise, the statement "substantially X, Y, or substantially Z" has the same meaning as "substantially X, substantially Y, or substantially Z," unless indicated otherwise.

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C. Additionally, unless otherwise specified, the use of or operates as an inclusive or.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps. Any configuration of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Further, a device or system that is configured in a certain way is configured in at least that way, but it can also be configured in other ways than those specifically described. The feature or features of one configuration may be applied to other configurations, even though not described or illustrated, unless expressly prohibited by this disclosure or the nature of the configurations.

Some details associated with the configurations are described above, and others are described below. Other configurations, advantages, and features of the present disclosure will become apparent after review of the entire application, including the following sections: Brief Description of the Drawings, Detailed Description, and the Claims.

BRIEF DESCRIPTION OF ILLUSTRATIVE EMBODIMENTS

FIGS. 3A-3D depict a side, top, left side and perspective view, respectively, of a computer of the railroad track feature detection system.

DETAILED DESCRIPTION OF ILLUSTRATIVE EMBODIMENTS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the configuration depicted in the figures.

Figure 1A:
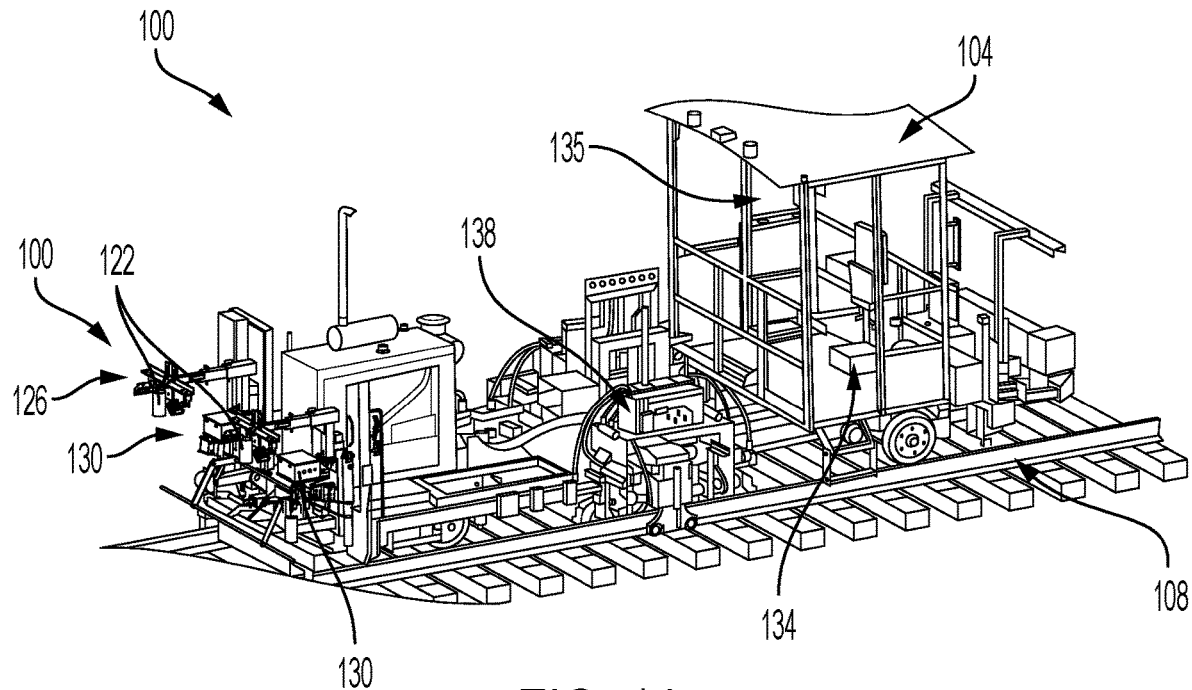
FIG. 1A depicts a first perspective view rail vehicle including a railroad track feature detection system.
Figure 1B:
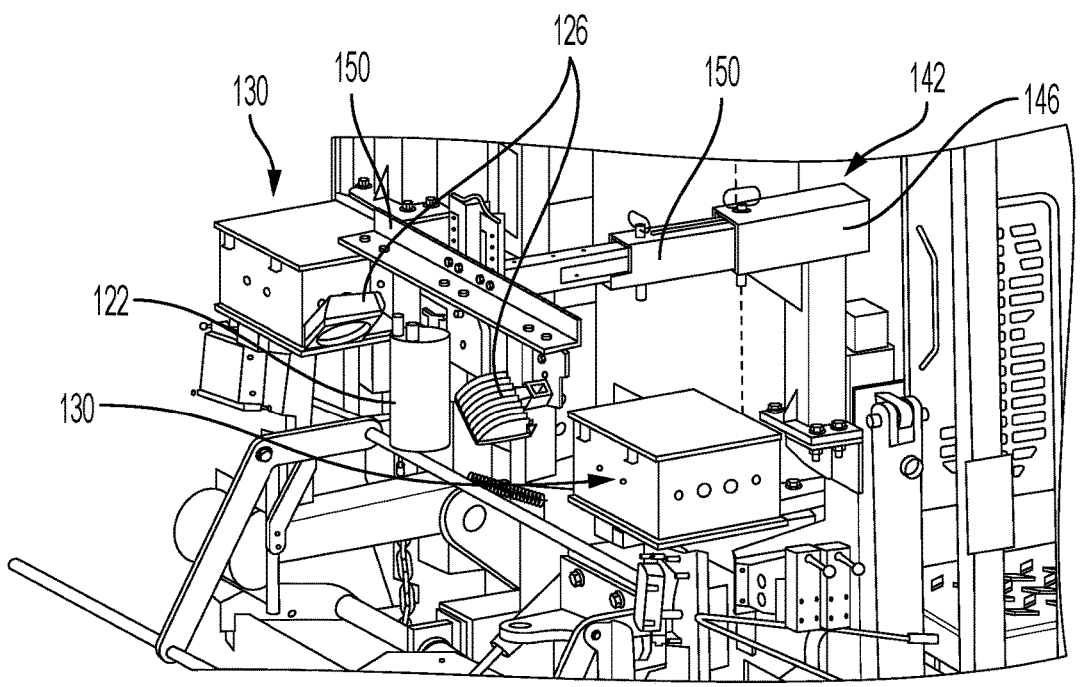
FIG. 1B depicts an enlarged view of the railroad track feature detection system of FIG. 1A.
Figure 1C:
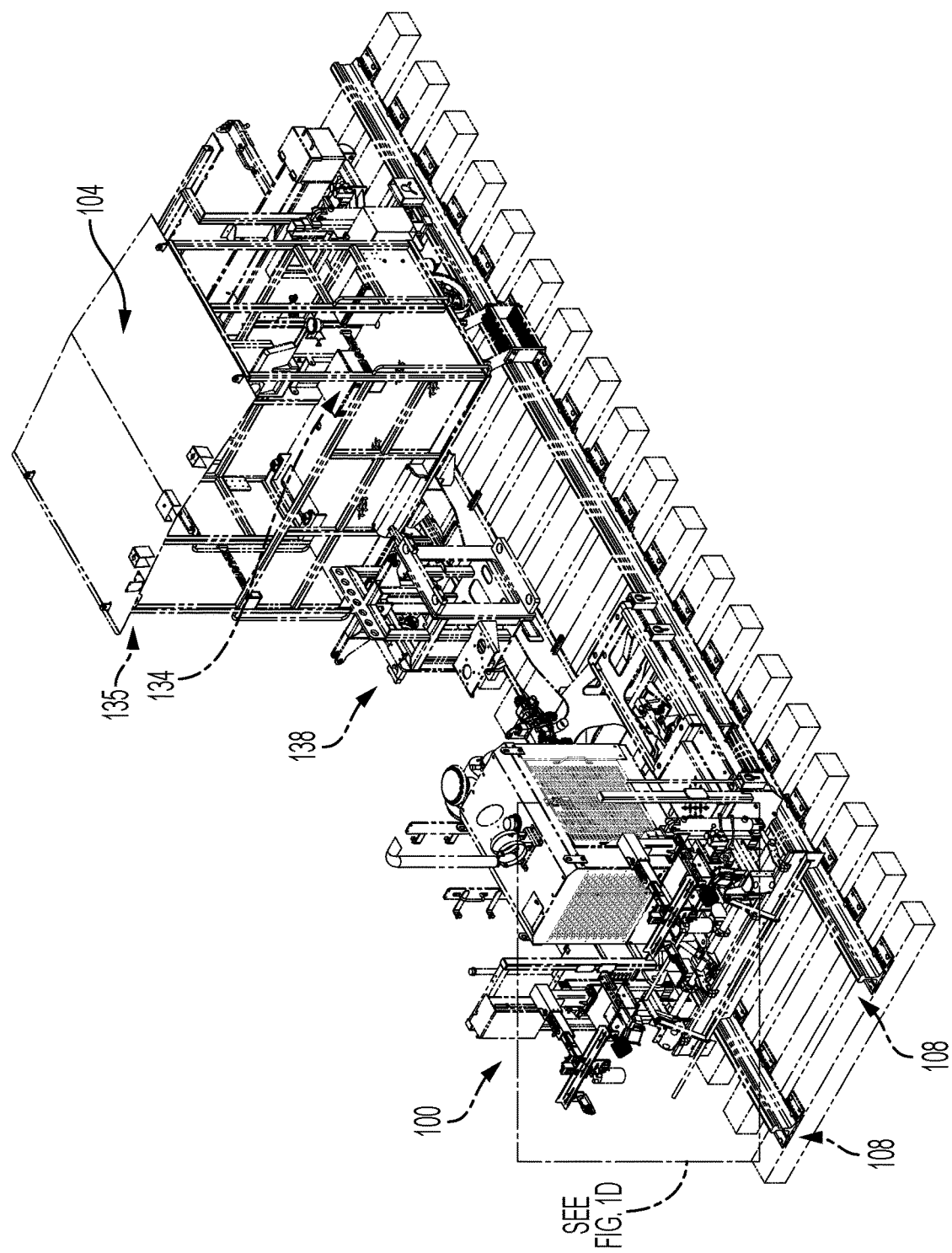
FIG. 1C depicts a second perspective view of the rail vehicle of FIG. 1A.
Figure 1D:
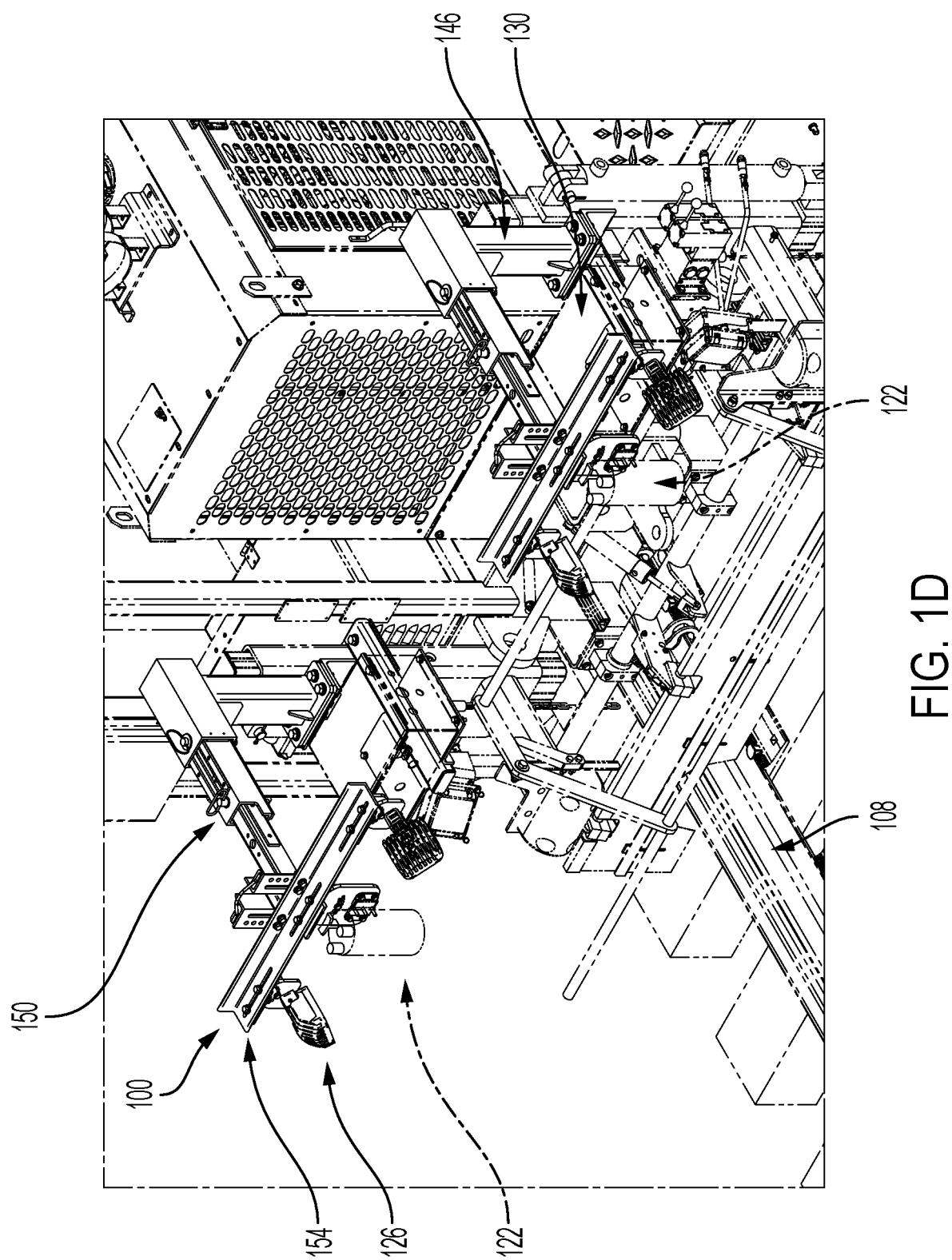
FIG. 1D depicts an enlarged view of the railroad track feature detection system of FIG. 1C.
Figure 1E:
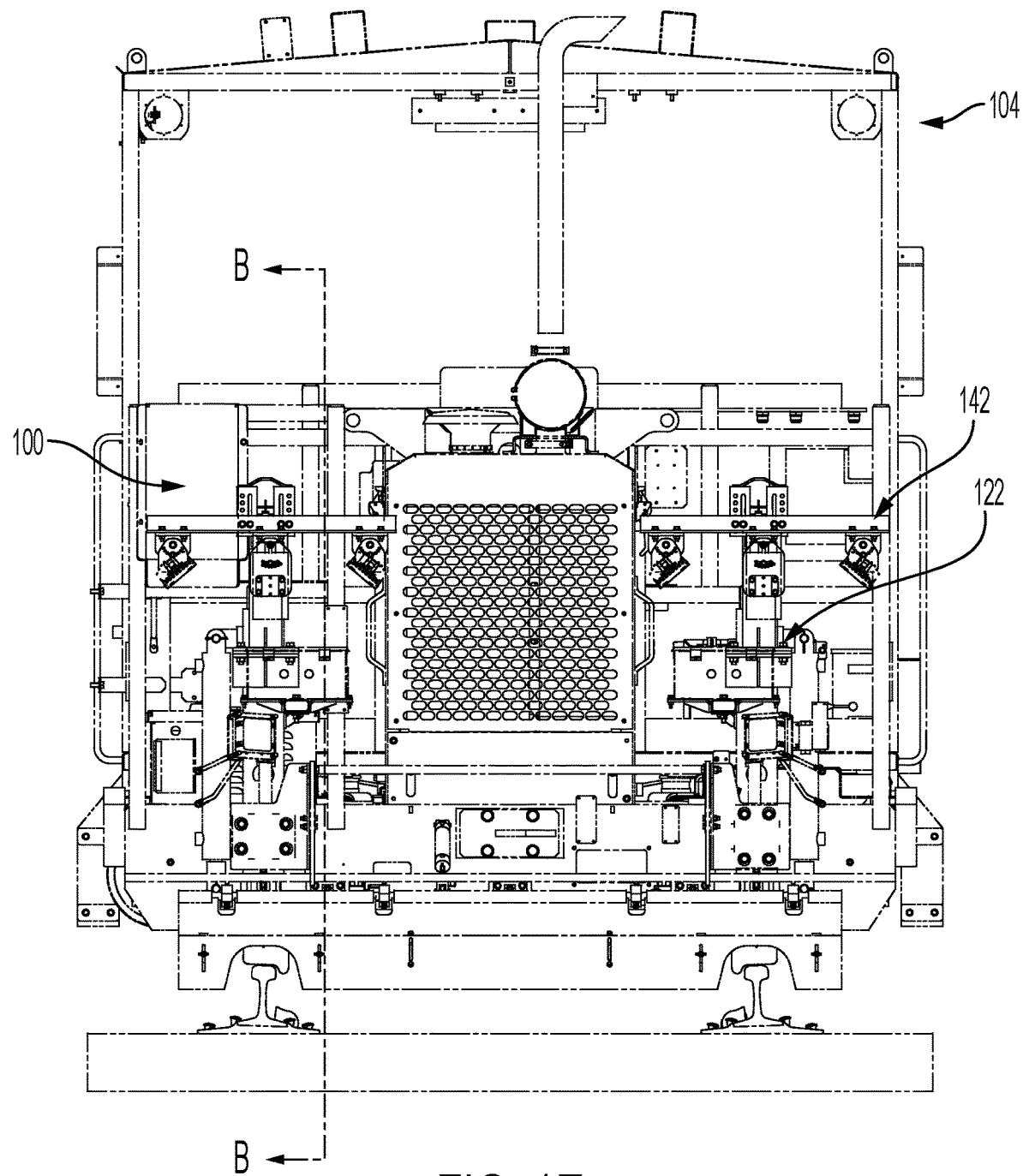
FIG. 1E depicts a front view of the rail vehicle of FIG. 1C.
Figure 1F:
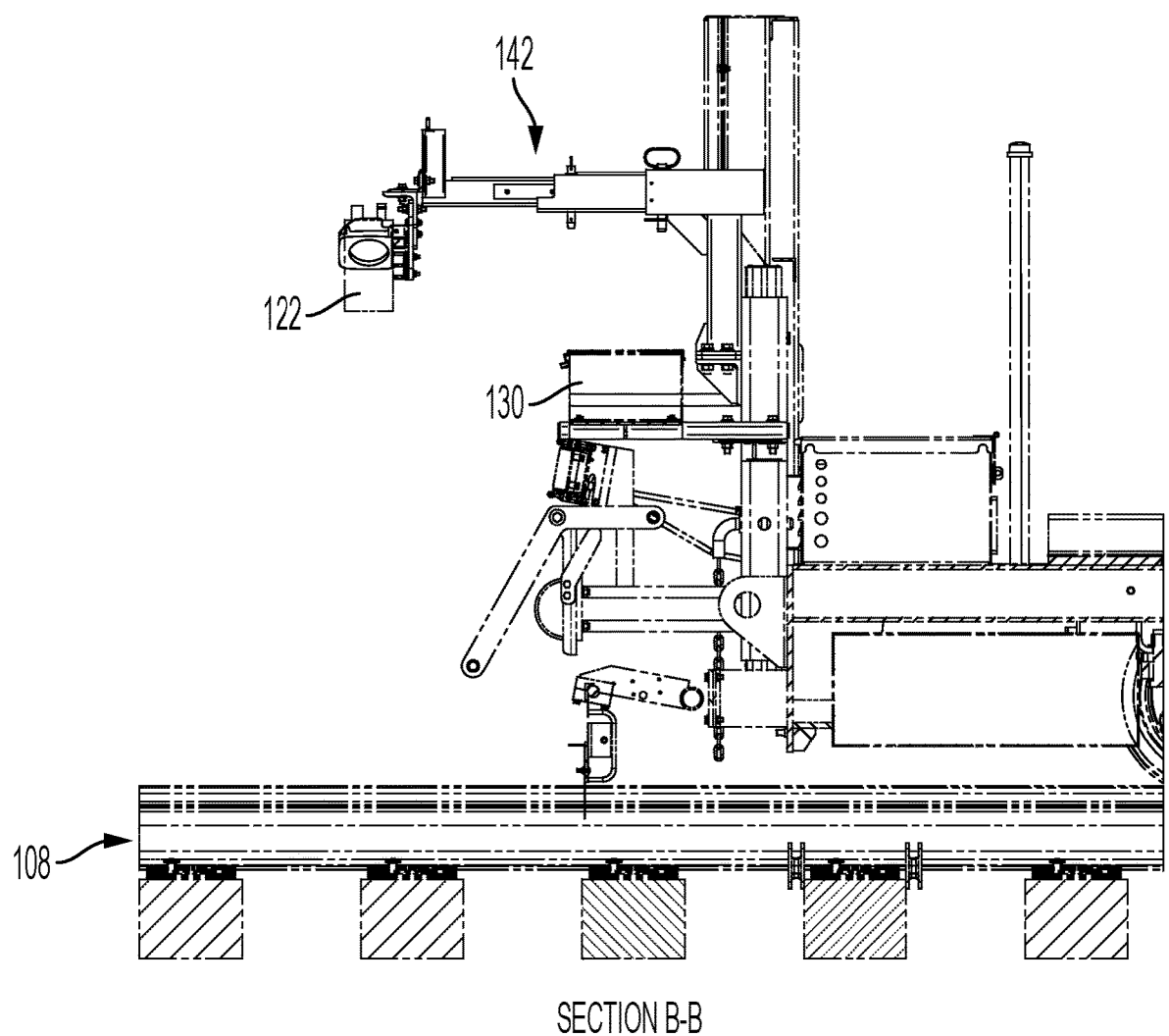
FIG. 1F depicts a section view of the rail vehicle of FIG. 1A about line B-B of FIG. 1E.
Figure 2A:
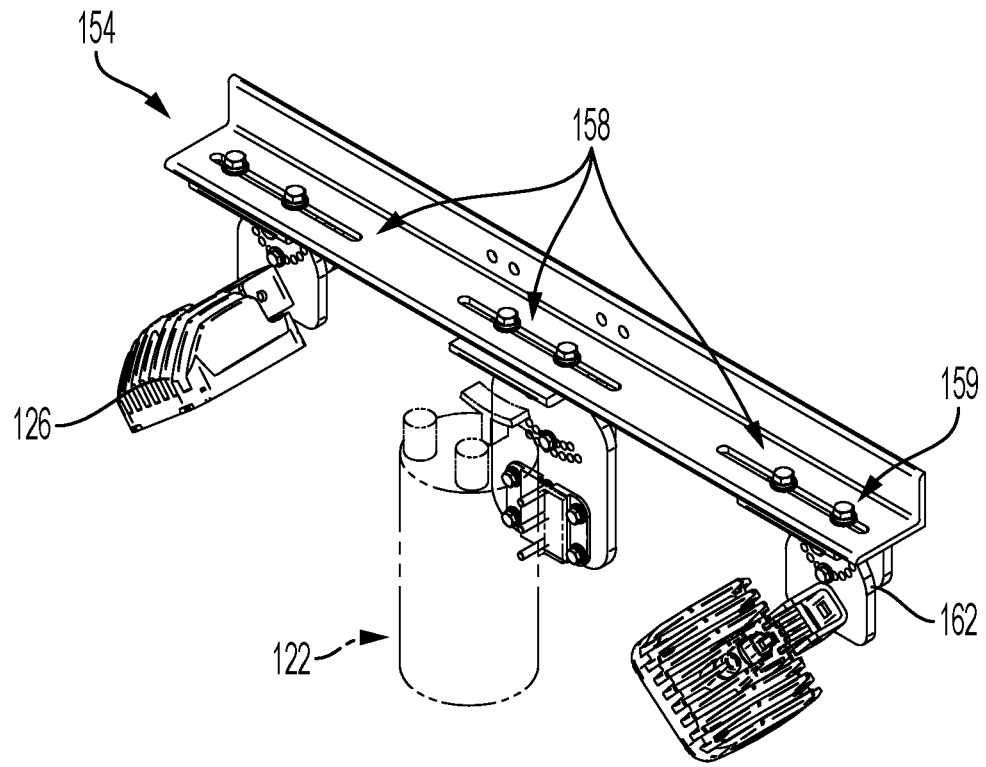
FIGS. 2A-2D depict a perspective, bottom, sectional, and top view, respectively, of a camera module of the railroad track feature detection system.
Figure 2B:
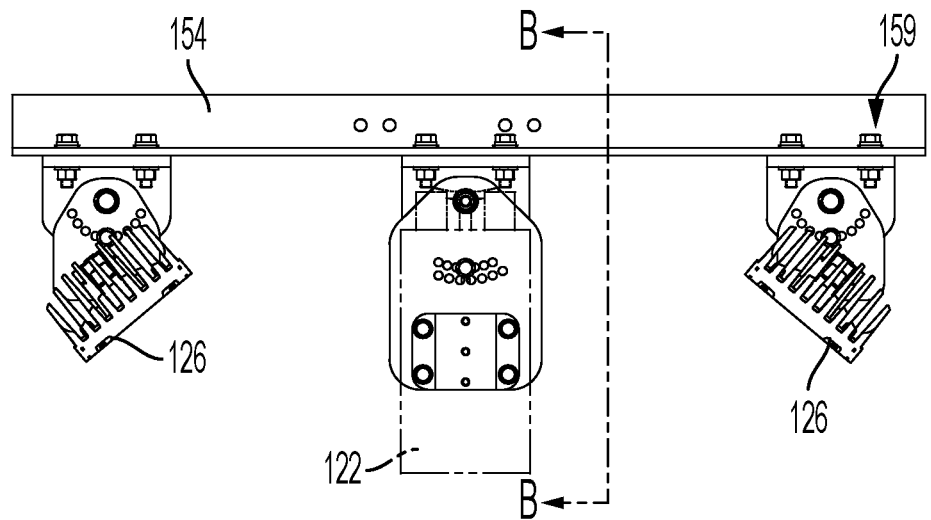
Figure 2C:
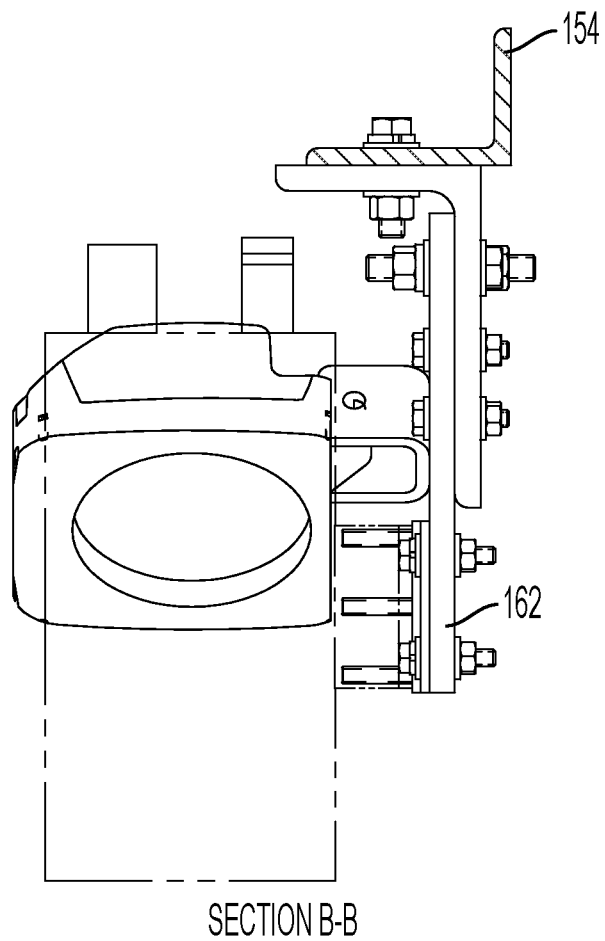
Figure 2D:
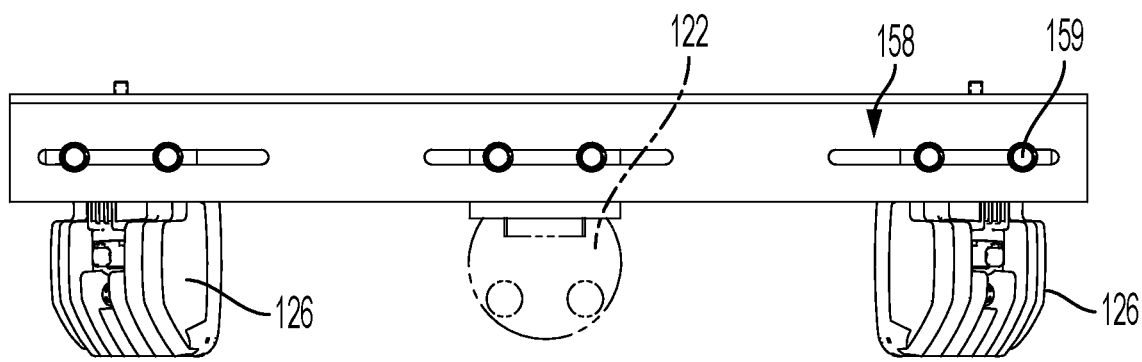

FIGS. 1A-1F depict first configurations of a railroad track feature detection system 110 coupled to a rail vehicle 114 that is propelled over a rail track 118. For example, FIG. 1A shows a top perspective view of railroad track feature detection system 110 coupled to rail vehicle 114; FIG. 1B shows an enlarged view of the railroad track feature detection system of FIG. 1A; FIG. 1B shows an enlarged view of the railroad track feature detection system of FIG. 1A; FIG. 1C shows an schematic perspective view of the railroad track feature detection system; FIG. 1D shows an enlarged view of the railroad track feature detection system of FIG. 1C; FIG. 1E shows a front view of the railroad track feature detection system; and FIG. 1F shows a side cross-sectional view of the railroad track feature detection system.

As shown in FIGS. 1A-1F, railroad track feature detection system ("detection system 110") includes one or more cameras 122, one or more light sources 126, and one or more computers 130 (e.g., processor with neural network logic). Detection system 110 may include, or be in communication with, a controller 134 of the rail vehicle (e.g., Jupiter II controller sold by HARSCO Rail) to perform one or more functions as described herein. For example, controller 134 may be in electrical communication with a work unit 138 that is configured to perform one or more rail operations (e.g., tamping, spike pulling, anchor spreading, or the like). In some configurations, controller 134 can be disposed in an operator cabin 135 of the rail vehicle 114.

As depicted in FIG. 1A, detection system 110 may include two cameras 122 disposed at front end of rail vehicle 114, each camera positioned to capture an image of a respective rail of rail track 118. In some such configurations, two light sources 126 may be disposed on either side of each camera (e.g., 122) and configured to illuminate rail track 118 while the images are being captured. Each camera 122 may be connected to one or more computers 130 (e.g., processor) to process the images or transmit the images to one or more other computer systems. In alternative configurations, each camera 122 may be integrated with computer 130. The computers 130 can be programed to perform certain functions based on receipt and/or processing of the images. For example, computer 130 may transmit one or more signals to controller 134 based on the images. In some configurations, based on receipt of the signals from computer 130, controller 134 may implement a process of the rail vehicle 114, such as controlling the movement of the rail vehicle, actuating work unit 138 to perform maintenance on the rail track, and/or the like. Computers 130 and cameras 122 cooperate to perform real-time processing (e.g., less than 1 second, such as less than 0.1 seconds) of the images. In this way, computer 130 may quickly transmit signals to controller 134 such that the controller may actuate work unit 138 to perform a function at the imaged portion of rail track 118 before rail vehicle 114 has moved past the imaged portion of the rail track. Of course, the number of cameras 122, light sources 126, and computers 130 could be different (e.g., more than or less than) than the amount shown. For example, one camera (e.g., 122) may be positioned to capture an image of both rails or, alternatively, multiple cameras (e.g., 122) may be positioned at each rail.

In the depicted configuration, cameras 122 and light sources 126 are coupled to rail vehicle 114 via a bracket assembly 142. Bracket assembly 142 may include a base 146, a first frame member 150, and a second frame member 154. In the depicted configuration, camera 122 and light sources 126 are coupled to second frame member 154 and base 146 is coupled to a frame, or other component, of rail vehicle 114 with first frame member 150 connecting the base to the second frame member. In some configurations, such as that depicted, first frame member 150 includes a telescopic member that is adjustable relative to rail vehicle 114 along a longitudinal axis of the vehicle. As shown, second frame member 154 is adjustable relative to rail vehicle 114 along a vertical axis to change a height of camera 122. Additionally, or alternatively, base 146 may be adjustable along the vertical axis to modify a height of camera 122 relative to rail track 118. In the configurations shown in FIGS. 1A-1F, bracket assembly 142 hangs off rail vehicle 114 (e.g., cantilevered) and is disposed between one and six feet above rail track 118. In some such configurations, base 146, first frame member 150, and/or second frame member 154 may be adjustable along a lateral axis of rail vehicle 114.

Computer 130 may be coupled to bracket assembly 142, or a separate mounting assembly, such that the computer is positioned adjacent to camera 122. This may enable a wired connection (e.g., Ethernet, USB, or other wired connection) between the camera and the computer to facilitate with the quick transmission of information between computer 130 and camera 122. However, in other configurations, camera 122 and computer 130 may be connected wirelessly. In either configuration, detection system 110 is configured for real-time processing of the images taken by cameras 122. As shown in FIG. 1B, computer 130 may include, or be stored within, a housing to protect the electrical components of the computer from the elements (e.g., rain, dust, sun exposure, pest, etc.).

Referring now to FIGS. 2A-2D, camera 122 and light sources 126 are shown coupled to second frame member 154. In the depicted configuration, second frame member 154 includes a beam that defines one or more slots 158 configured to receive a fastener 159 to couple camera 122 and light sources 126 to the second frame member. As shown, camera 122 and light sources 126 are coupled to second frame member 154 via brackets 162. In the depicted configuration, fasteners 159 extend though slots 158 to connect brackets 162 to second frame member 154 and can move laterally along the slots 158 to adjust a position of the brackets relative to the second frame member. Once a desired position of bracket 162 is selected, fasteners 159 can be tightened to prevent further movement along slots 158 and maintain the bracket at the selected position. In other configurations, camera 122 and light sources 126 may be fixed directly to second frame member 154 or, alternatively, may be coupled in any other suitable manner that allows the camera and light sources to be adjustable relative to one another.

Camera 122 may be any suitable time of imaging device that outputs image data (e.g., an image) or other file that indicates visual information. In some configurations, camera is a digital camera, while other configurations may be an active-pixel sensor (CMOS), charge-coupled device CCDs, LIDAR, 3D Vision camera, Quanta Image Sensor, or other image sensor. In some configurations, cameras 122 include one or more filters (e.g., polarizing filters, neutral density filters, UV filters, and/or the like). In some configurations, camera 122 includes a processor (e.g., 130, 134) and can be programmed to interact with light sources 126 and/or computer 130. However, in other configurations, computer 130 may be configured to control camera 122. In either configuration, the shutter of camera 122 may be adjustable based on lighting (e.g., ambient light and/or exposure) or other factors. For example, camera 122 may be configured to operate in a global shutter mode to avoid motion blur. Yet in other configurations, camera may operate in a roller shutter or other shutter mode. Additionally, or alternatively, camera 122 may be adjustable (e.g., controllable via a processor) such that the shutter varies with lighting conditions, such as ambient light, exposure, or other factors. Camera may be automatically controlled based on the lighting conditions. For example, if camera 122 detects low lighting conditions, computer 130 may control the camera 122 to initiate an automatic gain control (AGC) mode. In another example, computer 130 may control camera 122 to adjust a frame rate of the camera. Camera 122 can be configured to operate with a frame rate high enough to capture one or more track features while rail vehicle 114 is moving. In some such configurations, computer 130 may control frame rate based on the speed of rail vehicle 114. In an illustrative example, camera 122 is configured to capture images at least at 40 frames per second (fps) (e.g., greater than or equal to 40, 50, 60, 70, 80, 90, 100, 110, or 120 fps). The camera 122 and the computer 130 may be configured to identify one or more rail features within an image of rail track 118. The plurality of rail features may include a rail, a rail tie, a tie plate, an anchor, a spike, a spike hole defined by the tie plate, a joint bar, a joint bar bolt, and/or various other hardware. Upon identification of the rail features, computer may be configured to perform various functions, as discussed further below.

Figure 3C:
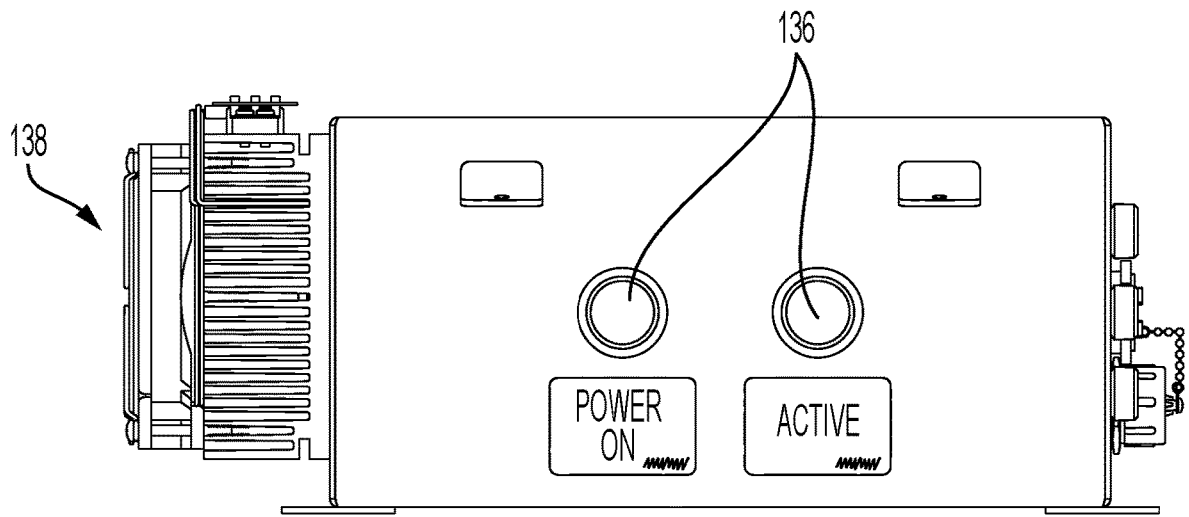
Figure 3D:
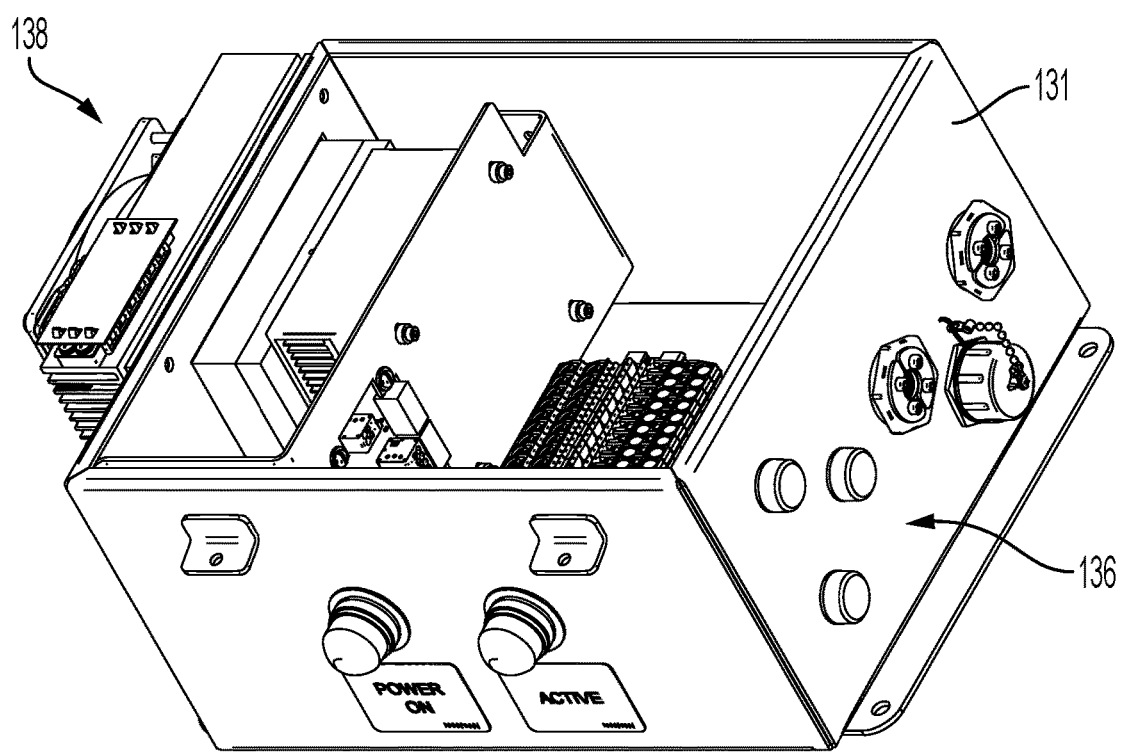

FIGS. 3A-3D shows several views of a computer 330 of the railroad track feature detection system 110. For example, FIG. 3A shows a side view of computer 330; FIG. 3B shows a top view of the computer; FIG. 3C shows a front view of the computer; and FIG. 3D shows a perspective view of the computer. Computer 330 may include or correspond to computer 130 and perform any of the functions described above with respect to computer 130.

Computer 330 may include a housing 331 that defines a cavity 332 configured to protect a processor 334 or one or more computing components (e.g., hardware) from the outside environment. In some configurations, computer 330 may, but need not, include one or more input/output (I/O) devices 336. The one or more I/O devices 336 may include one or more switches, one or more display devices, one or more touchscreens, one or more speakers, one or more light sources, or other types of components that enable a user to receive information from, or provide information to, computer 300. As depicted in FIGS. 3A-3D, computer 300 includes I/O devices 336 in the form of a power switch, an activation switch, a plurality of light sources. In some configurations, computer 330 may include, but need not, include a cooling element 338 configured to maintain or decrease the temperature of processor 334 or cavity 332. In the depicted configuration, cooling element 338 is a fan, but in other configurations, the cooling element may be a heat sink, heat pipe, or liquid cooling system (e.g., heat block, pump, reservoir).

Processor 334 may be a general purpose computer system (e.g., a personal computer (PC), a server, or a tablet device), a central processing unit (CPU), a special purpose processor platform (e.g., application specific integrated circuit (ASIC) or system on a chip (SoC)), or other computing circuitry. Processor 334 may include one or more processors, such as a baseband processor, an application processor, a graphics processor, or a combination thereof, as illustrative, non-limiting examples. As explained in more detail with respect to FIG. 6-9 below, computer may include an AI Module, GPU, microcontroller, one or more other processors, and/or the like and may be configured as a neural network (e.g., CNN, RNN, LSTM, or GAN). The neural network can be structured to include a plurality of code libraries (e.g., C, C++, or the like) to implement one or more instructions via the processor 334. In some implementations, the code libraries can include TersorFlow, Caffe, Digits, Darknet, or the like.

Figure 4A:
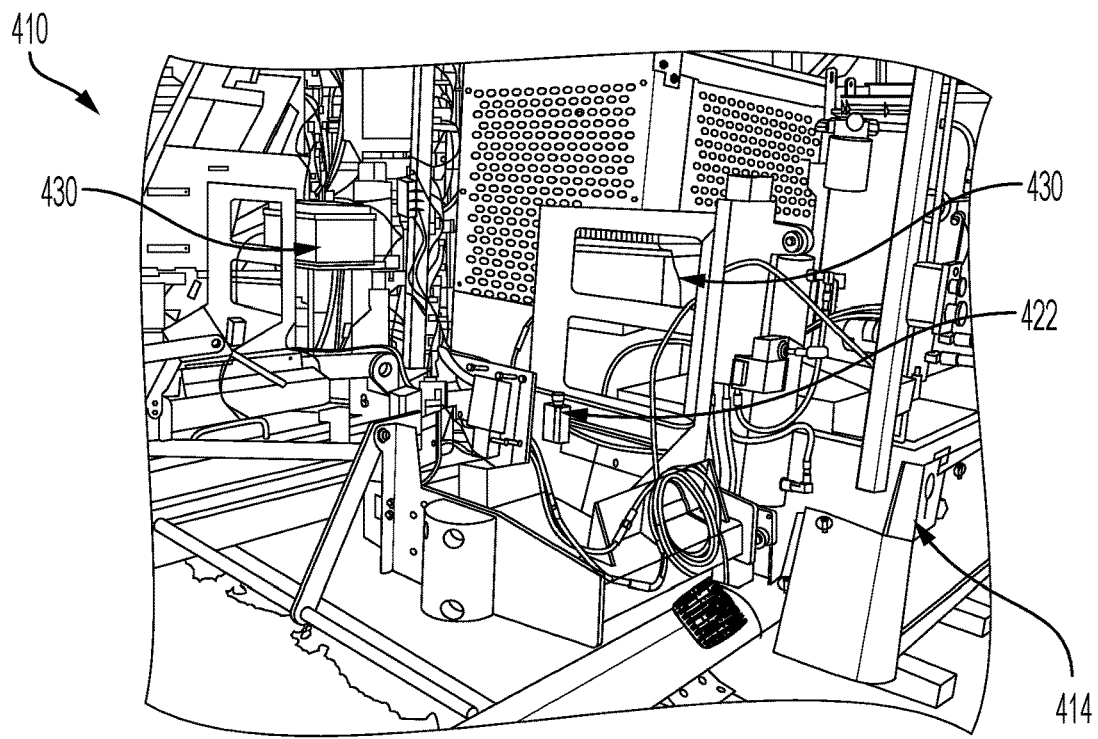
FIG. 4A depicts a first perspective view of another rail vehicle including a railroad track feature detection system.
Figure 4B:
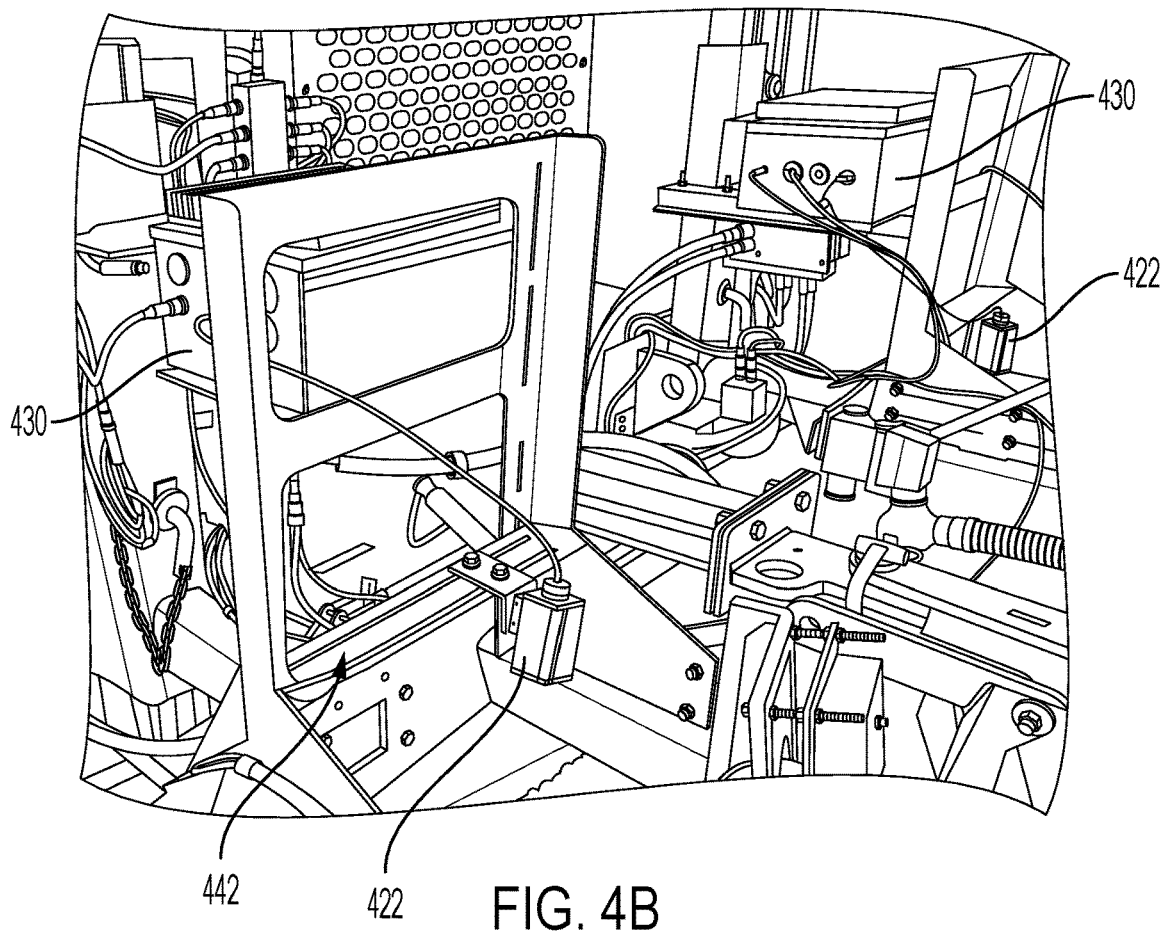
FIG. 4B depicts a second perspective view of the rail vehicle of FIG. 4A.
Figure 4C:
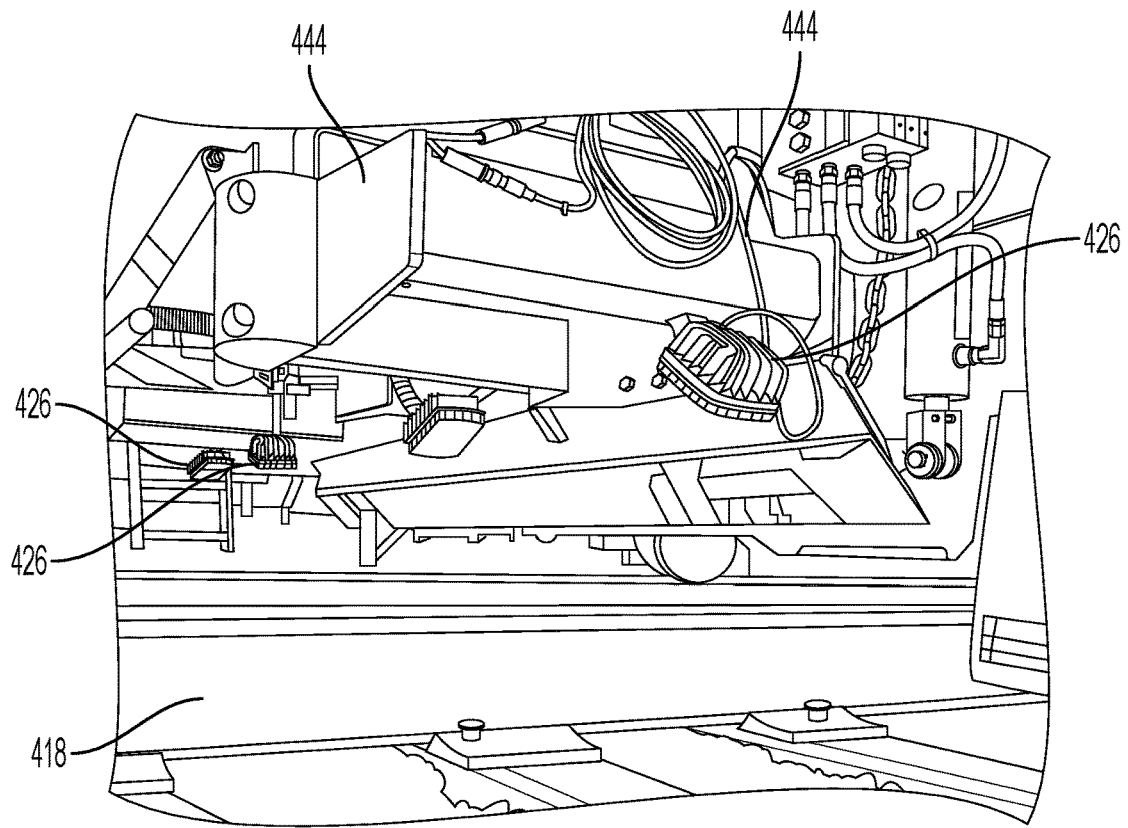
FIG. 4C depicts a side perspective view of the rail vehicle of FIG. 4A.
Figure 4D:
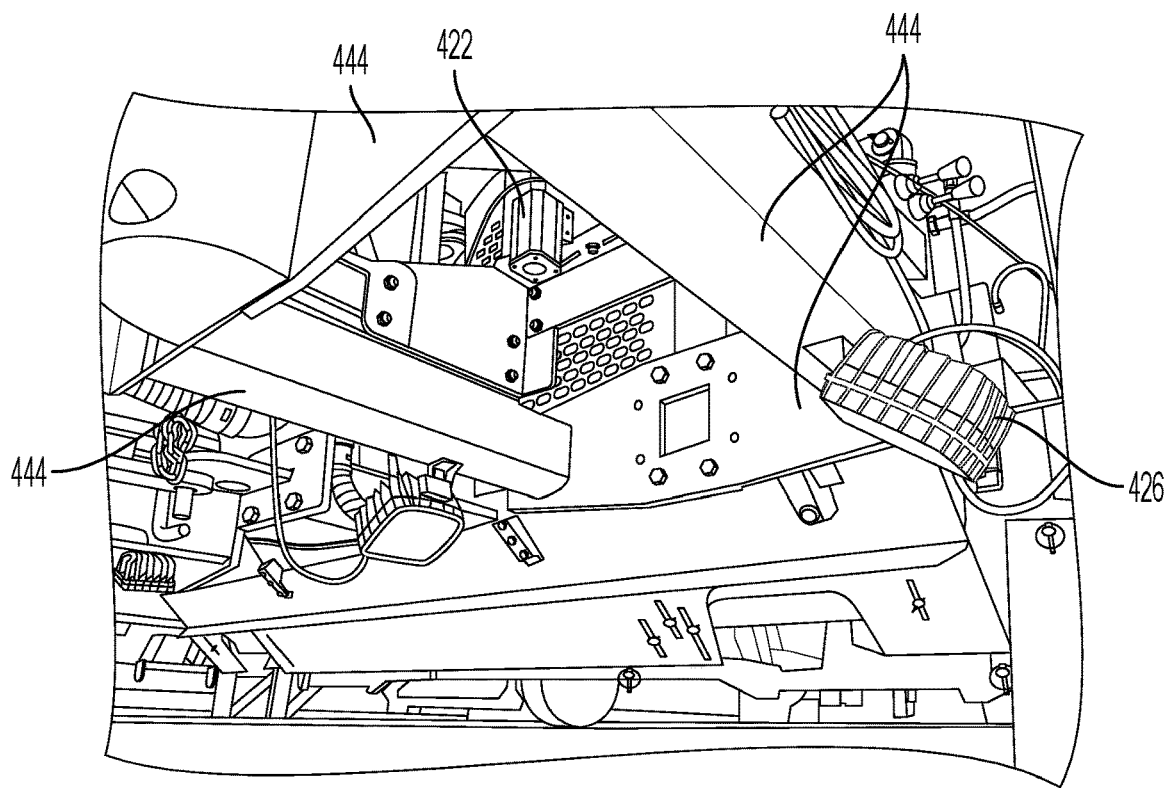
FIG. 4D depicts a bottom perspective view of the rail vehicle of FIG. 4A.

Referring now to FIGS. 4A-4D, various views of a railroad track feature detection system 410 are shown. For example, FIG. 4A shows a top right perspective view of railroad track feature detection system 410 coupled to a rail vehicle 414; FIG. 4B shows a top left perspective view of the railroad track feature detection system 410; FIG. 4C shows a side perspective view of railroad track feature detection system 410; and FIG. 4D shows a bottom perspective view of railroad track feature detection system 410. Railroad track feature detection system 410 may operate similarly to railroad track feature detection system 110, and may include components of the detection system 110 or include components that correspond to components of detection system 110.

Detection system 410 may include one or more cameras 422 and a computer 430 electrically coupled to the cameras. Cameras 422 and computer 430 may include or correspond to camera 122 and computer 130, 330, respectively. In some configurations, such as the configuration shown in FIG. 4A, one or more light sources 426 are disposed adjacent to the cameras and configured to illuminate a visual field of the cameras 422. FIG. 4A shows two cameras (e.g., 422) that each coupled to a frame of the rail vehicle 414 and oriented to capture images of a respective rail. As shown, each camera 422 is coupled to a respective computer 430 via a wire to transmit the images/visual information to the computer. However, in other configurations, more than one camera 422 may be coupled to the same computer 430. Additionally, or alternatively, computer 430 can be wireless coupled to camera 422 or integrated with the camera.

As shown in FIGS. 4A and 4B, cameras 422 are mounted to a front of rail vehicle 414 via a bracket assembly 442. Bracket assembly 442 may include a plurality of beams 444 that cooperate to define an opening 446 through which a visual field of camera 422 may extend. Referring to FIGS. 4C and 4D, bracket assembly 442 is at least partially interposed between camera 422 and a rail track 418. In some configurations, bracket assembly 442 may surround camera 422. For example, FIG. 4D shows camera 422 disposed between a first pair of beams (e.g., 444) that are aligned along an axis that substantially parallel to the rail and a second pair of beams (e.g., 444) that are aligned along an axis that substantially orthogonal to the rail. At least one of beams 444 may be positioned in front of railroad track feature detection system 410 to protect the detection system in the event of a collision. In some configurations, light source 426 is coupled to a bottom of at least one of beams 444. As shown, light source 426 is coupled to the first pair of beams (e.g., 444) that are substantially parallel to the rail and are configured to illuminate a portion of the rail 418 directly below the camera (e.g., the intersection between the visual field and the rail). In some configurations, beams 444 may be sized to block sunlight from the portion of the rail 418 directly below the camera.

In some configurations, camera 422 or light sources 426 may include one or more filters (e.g., polarized filter) configured to reduce glare or contrast in the images. Additionally, or alternatively, one or more shading components (such as screens, curtains, reflectors, or the like) may be coupled to beams 444 to mitigate the amount of sunlight that reached the rail 418. In some configurations, light sources 426 or camera 422 can be positioned to better control the shadows cast on rail 418. For example, camera 422 or light sources 426 may be adjustable (e.g., via an actuator coupled to computer 430) based the images taken by the camera. Specifically, in an illustrative example, camera 422 or light sources 426 may moved (e.g., laterally, vertically, rotationally, or combination thereof) based on the detection of shadows in an image or based on the position of rail features in the image. In this way, and others, the impact of shadows in the image detection processes, described herein, of images captured by camera 422 can be mitigated.

Figure 5:
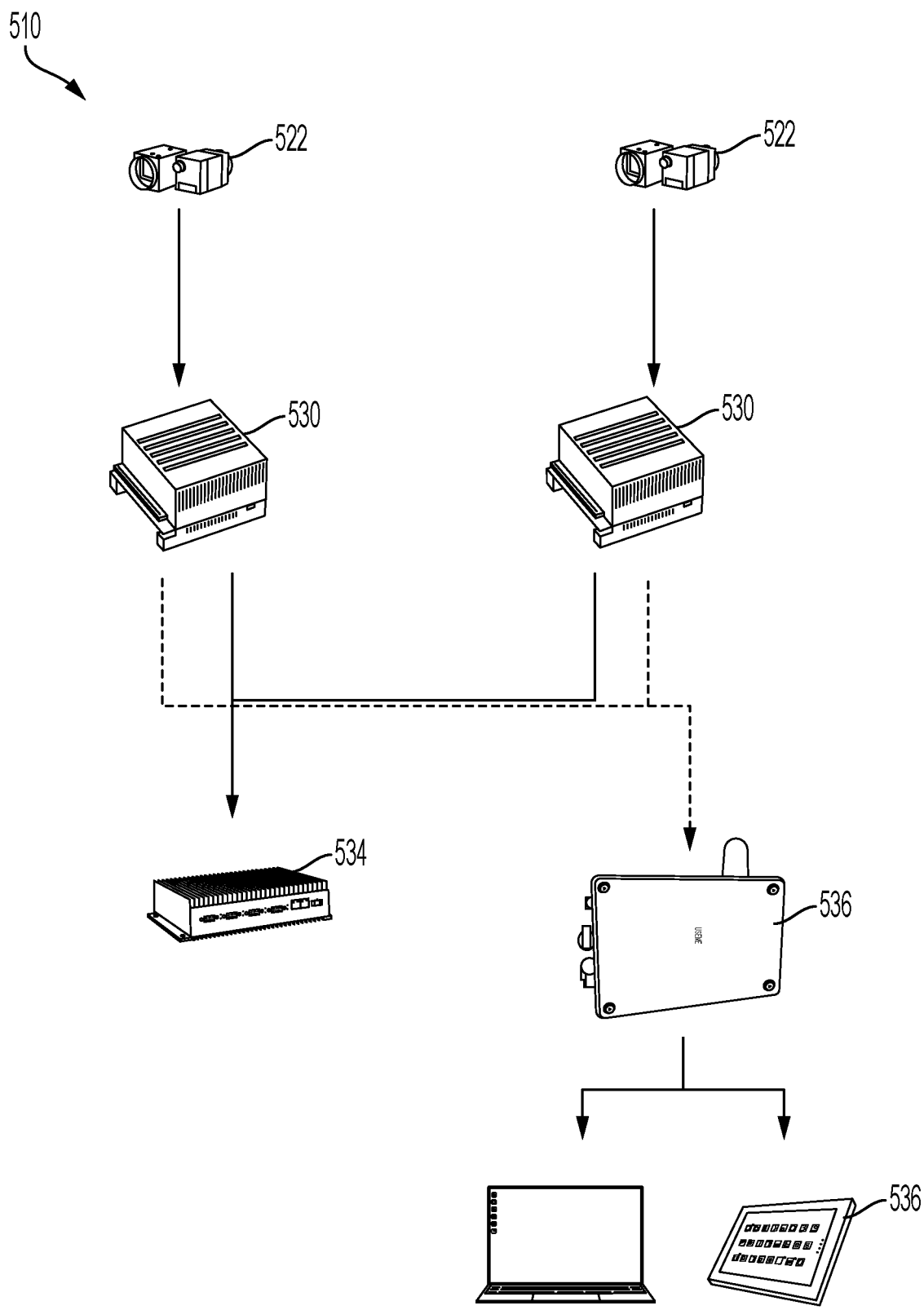
FIG. 5 depicts a first schematic diagram of an example of railroad track feature detection system.

FIG. 5 shows a schematic representation of a configuration of a railroad track feature detection system 510, which may include or correspond to detection system 110, 410. Railroad track feature detection system 510 includes at least one camera 522 (e.g., two cameras) and at least one computer 530 (e.g., two computers). Cameras 522 may correspond to a left rail (i.e., left camera) or a right rail (i.e., right camera) and are configured to capture images of a rail (e.g., 118) and transmit the images/visual information to computer 530. As an illustrative example, cameras 522 are connected to a respective computer 530 via a USB 3.1 wired connection, Computer 530 may include or correspond to an artificial intelligence (AI) module that is configured to process the images captured by cameras 522. For example, computer 530 (e.g., AI module) may be configured to detect one or more rail features within an image, identify the detected rail features from list of predetermined rail features, determine a location of the identified rail features, or combination thereof.

Each computer 530 may be connected to one or more other components to transmit or receive instructions or information associated with the processing of the images. In the depicted configuration, computer 530 is coupled to a controller 534 which may be connected to a vehicle, such as a rail vehicle (e.g., 114). Computer 530 and controller 534 may be coupled via a wired connection (e.g., Ethernet) or a wireless connection. In configurations, where controller 534 is coupled to a rail vehicle, computer 530 may send commands to the controller to operate the rail vehicle in a certain manner, based on image analysis of the rail Additionally, or alternatively, computer 530 can be connected to one or more other hardware components and/or networks (e.g., router, switch, or other communication hardware). As shown in FIG. 5, computer 530 is connected to a data management system 536 that is configured to store processed image data or transmit the processed image data to one or more other components. Computer 530 may be connected to data management system 536 via a controller Area Network bus (CAN bus) connection or other suitable connection. In some configurations, data management system 536 may include or correspond to a gateway or a memory. In such configurations, data management system 536 may convert or transmit the image data to one or more external devices 538. The external devices 538 may include a computer (e.g., at a control hub), a mobile phone, tablet, laptop, desktop, or any other computing device. In some configurations, the image data may be configured as text, image(s), and or video so that the information is easily accessible to a user. For example, the image data may be a generated map of the location of the rail features, a table showing a detailed breakdown of the type of rail features identified, an annotated video of the camera indicating the identified rail features, and/or the like.

Figure 6:
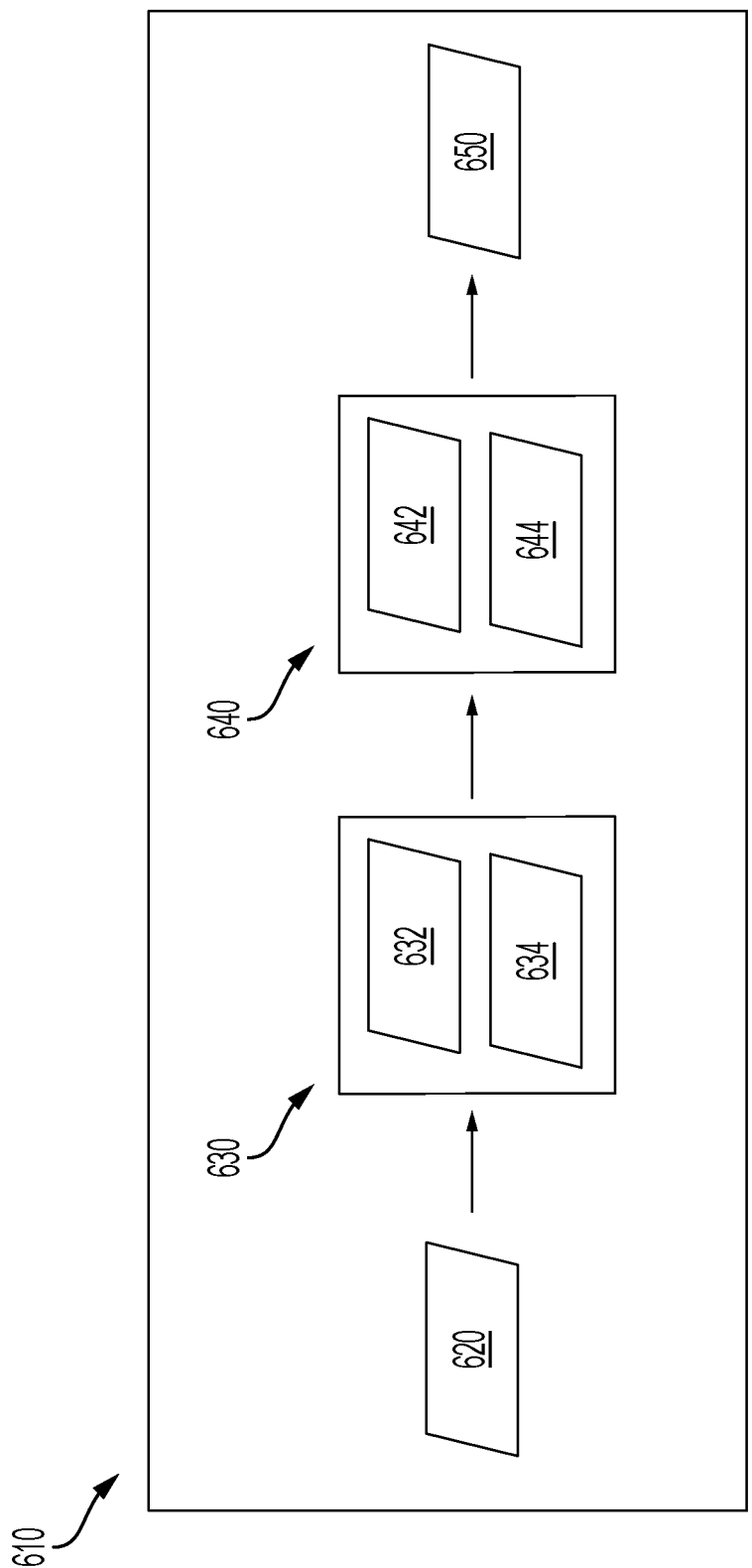
FIG. 6 depicts a second schematic diagram of an example of a railroad track feature detection system.
Figure 7:
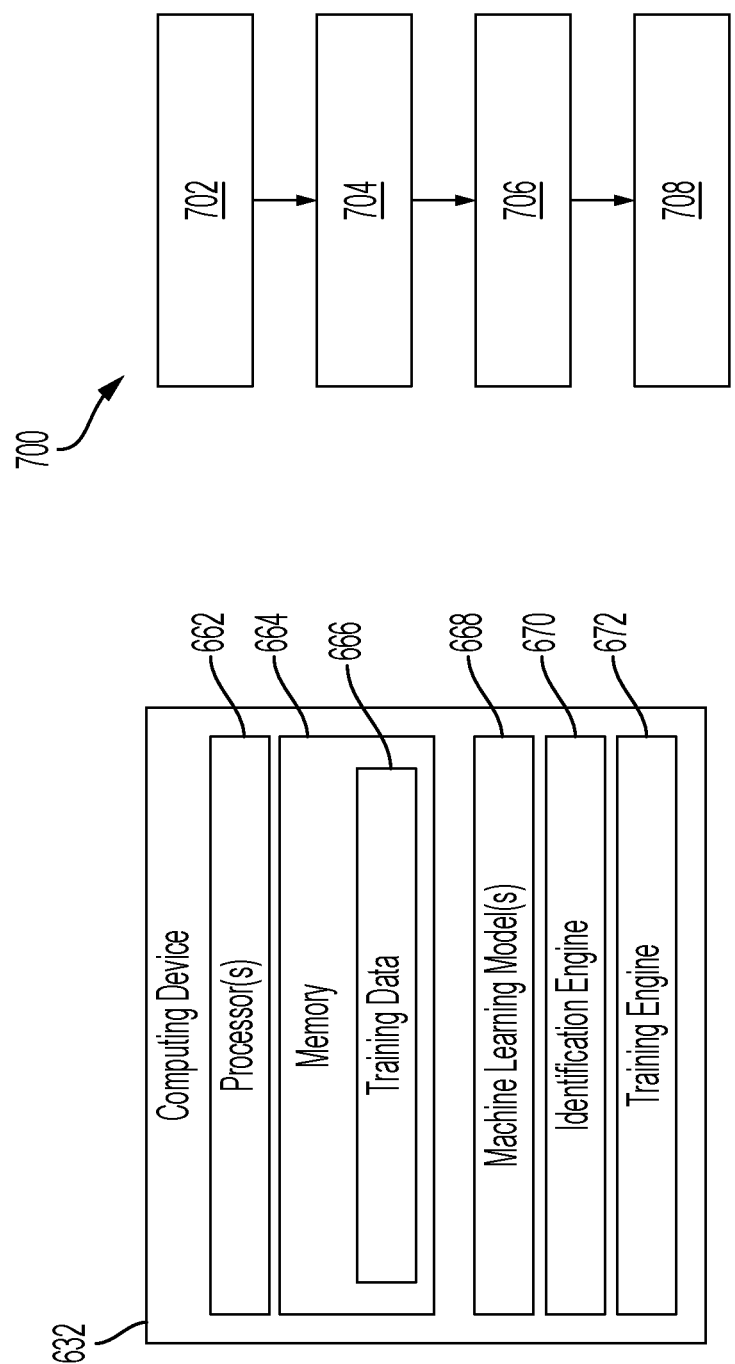
FIGS. 7A and 7B depicts a schematic diagram of an object detection module and an operation process of the object detection module, respectively.

FIG. 6 shows another schematic representation of a railroad track feature detection system 610, which may include or correspond to detection system 110, 410, 510. Railroad track feature detection system 610 includes various modules configured to perform certain functions, such as a camera module 620, a detection module 630, a tracking module 640, a CAN BUS module 650, or combination thereof. In some configurations, each module can be implemented via hardware (e.g., a processor) that is the same or different from that of the other modules.

Camera module 620 may be implemented via a camera (e.g., 122, 422, 522), computer (e.g., 130, 330, 430, 530), other hardware, or combination thereof. Camera module 620 is configured to capture a plurality of images, such as a plurality of images of a rail tracks while a rail vehicle moves along the tracks. Camera module 620 may initiate transmission of various signals to operate a camera at a particular frame rate (e.g., between 20 and 120 fps), resolution (between 5 and 10 pixels per physical inch of imaged structure), shutter speed. Additionally, or alternatively, camera may initiate transmission of various signals to operate a light source (e.g., 126, 426) to emit light, adjust an intensity of light, adjust an orientation of the light, or the like. For example, the light source may be height-adjusted to control the amount of light directed to the rail. In this way, and others, camera module 620 may adjust the operating parameters of camera or light sources to capture images with minimal interference, such as blurring, shadows, or the like.

Camera module 620 may output a captured image to another module (e.g., object detector module and/or color detector module). In some configurations, camera module 620 is configured to edit the images. To illustrate, camera module 620 may assign or include additional information with the image, such as a time stamp, or gps location of the image. In some configurations, camera module 620 assigns an identifier to each image before transmitting the image. In some such configurations, the identifier may correspond to an order in which the image was taken.

Detection module 630 may include an object detector module 632 and a color detector module 634. Detection module 630 may be implemented via a camera (e.g., 122, 422, 522), computer (e.g., 130, 330, 430, 530), other hardware (e.g., a control panel, a server, a user device, or the like), or combination thereof. Detection module 630 is configured to detect one or more objects in the image received from camera module 620, or other network. After detecting the objects, detection module 630 may subsequently classify the objects into categories or subcategories. For example, detection module 630 classify the detected objects into one of several predetermined categories or the detection module 630 may assign the object to a new category. As in illustrative example, detection module 630 may determine whether the objects are rail features, such as by classifying the detected objects as rail features or, alternatively, as non-rail features. If the object is classified as a rail feature, then the object may be stored and one or more other functions may be carried out based on the classification. On the other hand, if the object is classified as something other than a rail feature (e.g., vegetation, ballast, trash, or the like), then the object may be filtered out.

In some configurations, as explained further below, each object can be classified multiple times. For example, in configurations where camera is on a moving rail vehicle, images may be captured such that there in an overlap in successive images and a detected object (e.g., rail feature) is present in more than one image. In this way, detection module 630 may detect and classify the same object in two or more different images. In some such configurations, detection module 630 may receive the identifier assigned to each image by the camera module 620 and, based on the identifier, determine whether two or more different images contain the same object (e.g., rail feature). If the object is present in multiple images, detection module 630 may determine the object as a successive object and compare the classifications of the successive object for each image in which it appears. In other words, the object detector module may double check the classification of the object. Detection module 630 may transmit the processed image data (e.g., output detection list) to another module. For example, detection module 630 may transmit a classification of each rail feature to tracking module 640.

Referring now to FIG. 7A, a schematic model of object detector module 632 is shown. Object detector module 632 can include or be coupled to a processor 662 and a memory 664 (e.g., such as those included in computer 130, 330, 430) configured to store data, such as training data 666, one or more machine learning (ML) models 668, and an identification engine 670. In some configurations, object detector module 632 may include a training engine 672. It is noted that functionalities described with reference to the object detector module 632 are provided for purposes of illustration, rather than by way of limitation and that the exemplary functionalities described herein may be provided via other types of computing resource deployments. For example, in some implementations, computing resources and functionality described in connection with object detector module 632 may be provided in a distributed system using multiple servers or other computing devices, or in a cloud-based system using computing resources and functionality provided by a cloud-based environment that is accessible over a network.

The training engine 672 may be configured to generate training data 666 based on the processed image data, rail feature data, or other information. For example, the training engine 672 may extract a particular set of features from rail feature image data (e.g., historical track feature data) and group the extracted features, such as in one or more vectors, to generate the training data 666. Rail feature image data may include or correspond to images of rail features. In some implementations, the particular set of features are determined based on feature analysis of the rail feature image data and are predetermined for all types of rail feature identification. To extract the features, the training engine 672 may be configured to extract numerical features from numerical data, to extract categorical features from text or numerical data and convert the categorical features to numerical features, to perform natural language processing (NLP) on text data to convert text features into numerical features, or a combination thereof. In some implementations, the training engine 672 may be configured to scale or otherwise transform extracted features to a format that is useable to train ML models. After extracting the features, the training engine 672 may group or otherwise format the extracted features, such as performing vectorization on the extracted features, to generate the training data 666. Alternatively, training data 666 may be previously generated and loaded or transmitted to object detector module 632. In a non-limiting example, the training data 666 may include over 20,000 labeled rail features (e.g., 23,880 labeled features—4144 plates, 3410 anchors, 6904 spikes, 8494 holes, 213 rail segment gaps, 715 joint bolts).

After generating the training data 666, the training engine 672 may be configured to train the one or more ML models 668 that are accessible to the training engine (e.g., via storage at the memory 106 or other storage devices) based on the training data. The one or more ML models 668 may be trained to identify predetermined rail features previously-identified rail features indicated by training data 666. In some implementations, the one or more ML models 668 may be trained to identify rail features based on their location relative to other rail features based on the training data 66, such as by weighting or labeling training data based on the spacial relationships of the rail features. As an illustrative example, object detector module 632 may be configured such that rail spikes that are not coupled to (e.g., outside a perimeter of) a rail plate will not be identified as a rail spike. In this way, even though a spike is detected in an image, object detector module 632 may ignore the spike because it is no longer anchoring the plate. Alternatively, the one or more ML models 668 can be generated or trained elsewhere and the ML models may be pre-loaded or transmitted to object detector module 632.

In some configurations, ML models 668 may be pre-trained manually with thousands of images in which a user identifies the objects with boundaries that correspond to a predetermined rail feature to train the system. After training, ML models 668 generates a collection of weights and filters that are utilized by the object detection module. In some configurations, object detector module 632 includes processor 662 with a powerful GPU (e.g., 512 cores) that can calculate neurons/weights in parallel. As an illustrative example, the computer (via the ML model) may train a network which outputs a 'weight' file having neuron weights and feature kernels. The 'weights' may be loaded into at least one of the processors configured to perform inferencing (detection) independent of the ML models. The processor may be configured to run data at 50 frames per second or faster. In this way, object detector module 632 may receive the image and pass the image through the neural network to calculate a classification/confidence score (% from 20-100), and if the confidence score exceeds a threshold value (e.g., typically set threshold around 80%), the object detection module identifies the rail feature. Of course there may be one or more intermediate ML models that modify the data between input and identification. Additionally, or alternatively, there may be one or more subsequent or previous ML models, as described below. The ML models (e.g., neural network) may include several sets (i.e., libraries) of equations that are generally configured for training, output, or other functions. In some such configurations the ML models may include libraries (e.g., Darknet) designed for edge computing. In some configurations, the output may vary for different ML models, such as classifications models (no outline), outline (box/segmentation), object classifications, track object movement, predict/forecast, generate, and or the like.

In some implementations, the one or more ML models 668 (referred to herein as the ML models 668) may include a single ML model or multiple ML models configured to identify rail features. In some implementations, ML models 668 may include or correspond to generative ML models. In some such configurations, ML models 668 are configured to group the objects into clusters based on categories of the objects. One such cluster may correspond to rail features (e.g., a rail, a rail tie, a tie plate, an anchor, a spike, a spike hole defined by the tie plate, a joint bar, a joint bar bolt, and/or various other hardware). For example, ML models 668 may include generative adversarial networks (GANs), such as multi-objective GANs, objective reinforced GANs, conditional deep GANs, and the like, variational autoencoders (VAEs), such as standard VAEs, multi-objective VAEs, and the like, or a combination thereof. Generative modeling is an unsupervised learning task that involves automatically discovering and learning patterns or relationships in input data in such a way that a model can be used to generate or output new examples that plausibly could have been drawn from the input data set. GANs can be used to frame the problem as a supervised learning problem with two sub-models: a generator model that is trained to generate new examples, and a discriminator model that is trained to classify examples as either real (e.g., from the input data set) or fake (e.g., from the generator model). The two models, typically convolutional neural networks, are trained together in a zero-sum game, until the discriminator is fooled by the generator a particular percentage of the time. VAEs may be configured to learn efficient data codings in an unsupervised manner, such as by encoding higher-dimensionality input data as probability distributions of latent variables, and decoding the probability distributions of the latent variables to create slightly different versions of the input data. In some implementations, the ML models 668 (e.g., the GANs, the VAEs, or both) may be implemented as neural networks. In other implementations, ML models 668 may be implemented as other types of ML models or constructs, such as other neural networks (NNs), long short-term memory (LTSM) networks, recurrent neural networks (RNNs), convolutional neural networks (CNNs), or support vector machines (SVMs), decision trees, random forests, regression models, Bayesian networks (BNs), dynamic Bayesian networks (DBNs), naive Bayesian (NB) models, Gaussian processes, hidden Markov models (HMMs), and the like. In a non-limiting configuration, ML models 668 may include a 75 layer CNN. In another configurations ML models 668 may include 45 layers and use a mesh activation capable at processing around (within 10% of) 100 frames per second. In yet other configurations, ML models 668 may include around 160 layers. As the number of layers can be changed, it is noted that the increase in layers may increase accuracy, but can have a negative effect on processing speeds (e.g., slower).

The identification engine 670 may be configured to identify the detected rail features in the images. For example, the identification engine 670 may provide input data to the ML models 668 to cause the ML models to identify rail features that may have an underlying similarity to the rail features indicated by the input data. Object detector module 632 may then generate or initiate generations of a signal, based on the identification the detected rail features.

It is noted that the models utilized by configurations of the disclosure may utilize machine learning techniques to analyze objects and classify object (e.g., determine labels that should be output) for a given set of inputs (e.g., a training dataset of rail features, image data, etc.). It is noted that the particular model parameters and the data types accepted as inputs by the models may depend on what classification/clustering machine learning algorithms are used. For example, where neural network models are utilized, the parameters may be biases (e.g., a bias vector/matrix) or weights and where regression-based machine learning algorithms are used the parameters may be differential values.

Referring to FIG. 7B, a flow diagram of an example of a method for identifying rail features is shown as a method 700. In some implementations, the operations of the method 700 may be stored as instructions that, when executed by one or more processors (e.g., the one or more processors of a computing device or a server), cause the one or more processors to perform the operations of the method. In some implementations, method 700 may be performed by one or more components of a system configured to perform object identification (e.g., rail feature identification), such as one or more components of the railroad track feature detection system 110, 410, 510, 610. In some configurations, the method 700 may include collecting or training one or more ML models, as described above.

The method 700 may include predicting a cluster to which one or more rail features are assigned, at 702. Each of the clusters may correspond to a respective pre-determined rail feature that is selected or identified by object detector module 632. To illustrate, the system may train one or more ML models to perform unsupervised learning to cluster previously-identified rail features into clusters corresponding to the particular type of rail feature and other rules established based on training data. Input data indicating one or more rail features (e.g., feature vectors) may be provided to the trained ML models to predict the cluster assignment using sparse subspace clustering (SSC). In some implementations, the clustering may include density-based spatial clustering of applications with noise (DBSCAN), K-means clustering, K-means for large-scale clustering (LSC-K), longest common subsequence (LCS) clustering, longest common cyclic subsequence (LCCS) clustering, or the like, in order to cluster large volumes of high dimensional data.

The method 700 may include generating cluster data, at 704. The cluster data may indicate the members of each cluster, rail features associated with the clusters, or the like. Additionally or alternatively, the system may determine scores for each rail feature in a cluster to which a particular rail feature is assigned, the scores may be used to filter the cluster into a subset of higher-scored features, and the cluster data may indicate the scores, the subset, or the combination thereof. To illustrate, each rail feature assigned to the cluster may be scored using one or more scoring metrics, and the scores for a respective rail feature may be averaged to generate an average score (or other aggregated score) for each feature. The average scores may be compared to one or more thresholds to identify the rail feature or determine the object is unable to be identified. In some implementations, the scoring may be performed based on Tanimoto indices or coefficients, cosine similarity values, laboratory control sample (LCS) data, Library for the Enumeration of Modular Natural Structures (LEMONS) data, or the like. The method 700 may include storing the cluster data in a database.

The method 700 may further include performing risk analysis on the identified rail features, at 706. The risk analysis may indicate which rail features may be at a risk of potential failure or have already failed. Such risk analysis may be performed by one or more ML models using training data associated with rail features that have failed or need to be replaced. The identification of high-risk rail features may be performed similarly to the identification of a particular rail feature from the plurality of pre-determined rail features.

For example, each identified rail feature may go through a second step of clustering—including predicting clusters and generating cluster data. In an illustrative example, scoring metrics are assigned to each identified rail feature based on a risk of potential failure and the scores are compared to one or more failure thresholds.

The method 700 concludes by output recommendations for one or more rail features, at 708. In some configurations, each failure threshold may be associated with a maintenance action. The maintenance actions may be configured to prevent occurrence of a risk (e.g., derailment), and the maintenance actions may be performed by the work unit of the rail vehicle or stored in a data base until an appropriate rail vehicle can perform the maintenance action. After determination of one or more maintenance actions, object detector module 632 may generate an output that indicates the maintenance action to be performed. As a particular example, object detector module 632 may provide an output to a display device to cause the display device to display the one or more maintenance actions, as well as other information. Additionally, or alternatively, object detector module 632 may transmit a signal to a controller of the rail vehicle to initiate performance of the maintenance action.

Referring back to FIG. 6, color detector module 634 is configured detect one or more color markers disposed on the rail. To illustrate, color detector module 634 may receive hue/saturation/value (HSV) values, and/or red-green-blue (RGB) color values from camera module 620. However, in other configurations, color detector module 634 may determine a HSV or RGB color value from the image data sent by camera module 620. For example, color detector module 634 may determine a HSV or RGB color value of each pixel of the image and the spacial relationships of the determined color values. In some configurations, the color markers may be placed on the rail by a rail worker to signal the railroad track feature detection system. Each color may correspond to a particular track feature, a section of track, a function that needs to be performed, and/or any other type of information. For example, blue paint markers may be used to identify anchor locations where spreading is needed, whereas green markers may be used to identify anchor locations where squeezing is needed. In some configurations, the color markers are disposed on the foot of the rail, while, in other configurations, the color markers may be disposed on any visible location of the rail or rail tie.

Color detector module 634 may detect a portion of the image that corresponds to color markers and classify the color markers. In some configurations, detection or classification of the color marker may utilize one or more machine learning (ML) models, such as a CNN, as described with respect to object detector module 632. Color detector module 634 may then transmit the processed image data (e.g., output detection list, associated maintenance actions, or the like) to another module. For example, detection module 630 may transmit a classification of each color marker to the tracking module 640.

Tracking module 640 includes a tracker module 642 and a system module 644 and is configured to be in communication with the one or more other modules. Tracking module 640 may receive the outputs from the object detector module 632 and the color detector module 634 to track the identified rail features and color markers.

Tracker module 642 may assign a unique identification (ID) number to each feature identified by detection module 630 (e.g., features in the output detection list). The unique ID number may contain geographical data or, alternatively, tracker module 642 may determine location data that corresponds to the respective feature assigned the unique ID number.

For example, tracker module 642 may calculate a distance between at least two identified features based on the spatial relationships of the features and the overall size of the image. In some configurations, the distance may be calculated several times if the at least two features are present in more than one image. To illustrate, tracker module 642 may receive data indicating a first set of identified features found in a first image and a second set of identified features found in a second image, which is taken after the first image. Tracker module 642 may compare the first and second set of features to determine which overlapping features that appear in both images. Tracker module 642 may then use this determination, along with other data (e.g., speed of rail vehicle, time between images, or the like) to calculate the distances between identified features. In some configurations, the distances or information associated with the distances may be output to one or more external devices (e.g., rail vehicle controller, gateway, display, etc.). As an illustrative example, tracker module 642 may communicate with a display screen to depict a map of the rail track (e.g., as shown in FIGS. 10A-10D), illustrating each of the identified rail features and information associated with the respective features (e.g., maintenance status, type of feature, etc.). In this way, and others, tracker module 642 may be able determine the location of each identified feature within ¼ of an inch and, more particularly, within ¹⁄₁₀ of an inch. This allows detection system 610 to communicate with a rail vehicle controller to perform maintenance functions at the right location.

In some configurations, tracker module 642 may be configured to discriminate (e.g., filter out) one or more irrelevant rail features. For example, tracker module 642 may determine that an identified rail spike is pulled out of a rail plate and filter out the rail spike as not being present (i.e., spike that is not on a plate, either is not a spike or is a spike that is not relevant to removing the plate so it can be ignored).

In some configurations, tracker module 642 may discriminate the identified features based on the calculated distances, as described above. As an illustrative example, an identified anchor that is disposed inside of a plate cannot be an anchor, but instead may be a spike. In this way feature identification accuracy can be improved for rail features with similar appearances—such as spikes and anchors. Further, during normal rail operations rail spikes can be smashed down to look less like a spike and may be difficult to identify based on an image. Accordingly, tracker module 642 act to verify the identification made by object detection module 632. Additionally, or alternatively, tracker module 642 may determine if the identified color marker corresponds to a paint dot placed by a worker or some additional marking that is not intended to indicate any information.

In yet another example, tracker module 642 may operate to target a specific rail feature (or set of specific rail features), such as features identified by a user. To illustrate, if railroad track feature detection system 610 is operating to only identify rail anchors, tracker module 642 may filter out any identified rail feature that is not an anchor. In this way, tracker module 642 may allow selective identification of rail features without having to re-train the ML models utilized by object detection modules 632. This can save computing power and unnecessary notifications as a rail track may contain several thousand rail ties depending on the length of track. In some configurations, tracker module 642 may utilize one or more machine learning (ML) models, such as a CNN, to calculate location information or filter out one or more previously identified features.

System module 644 is configured to receive one or more other inputs, outside of the image data, related to the track. For example, system module 644 may include a thermometer configured to measure a temperature of the rail. In other configurations, system module 644 may include a distance sensor to determine a distance between the camera and the rail, an encoder wheel to determine a distance the rail vehicle moves along the track, and/or other suitable sensors. In some such configurations, system module 644 may then output system data to one of the other modules. In some configurations, the system module may include, or be in communication with, the rail vehicle controller (e.g., 134).

CAN BUS Module 650 is configured to revive an output from tracking module 640 and transmit the output information to one or more other devices (e.g., external devices). CAN BUS Module 650 may receive and/or transmit data, commands, or other information among the railroad track feature detection system. For example, CAN BUS Module 650 may convert the location and feature data from the tracker module, camera module, object detector module, and/or color detector module to a video file to stream on a display panel of the rail vehicle, at a control hub, at an operator's device, or the live. In other configurations, CAN BUS Module 650 may convert the outputs into a text file that is sent to external servers to be stored.

Figure 8:
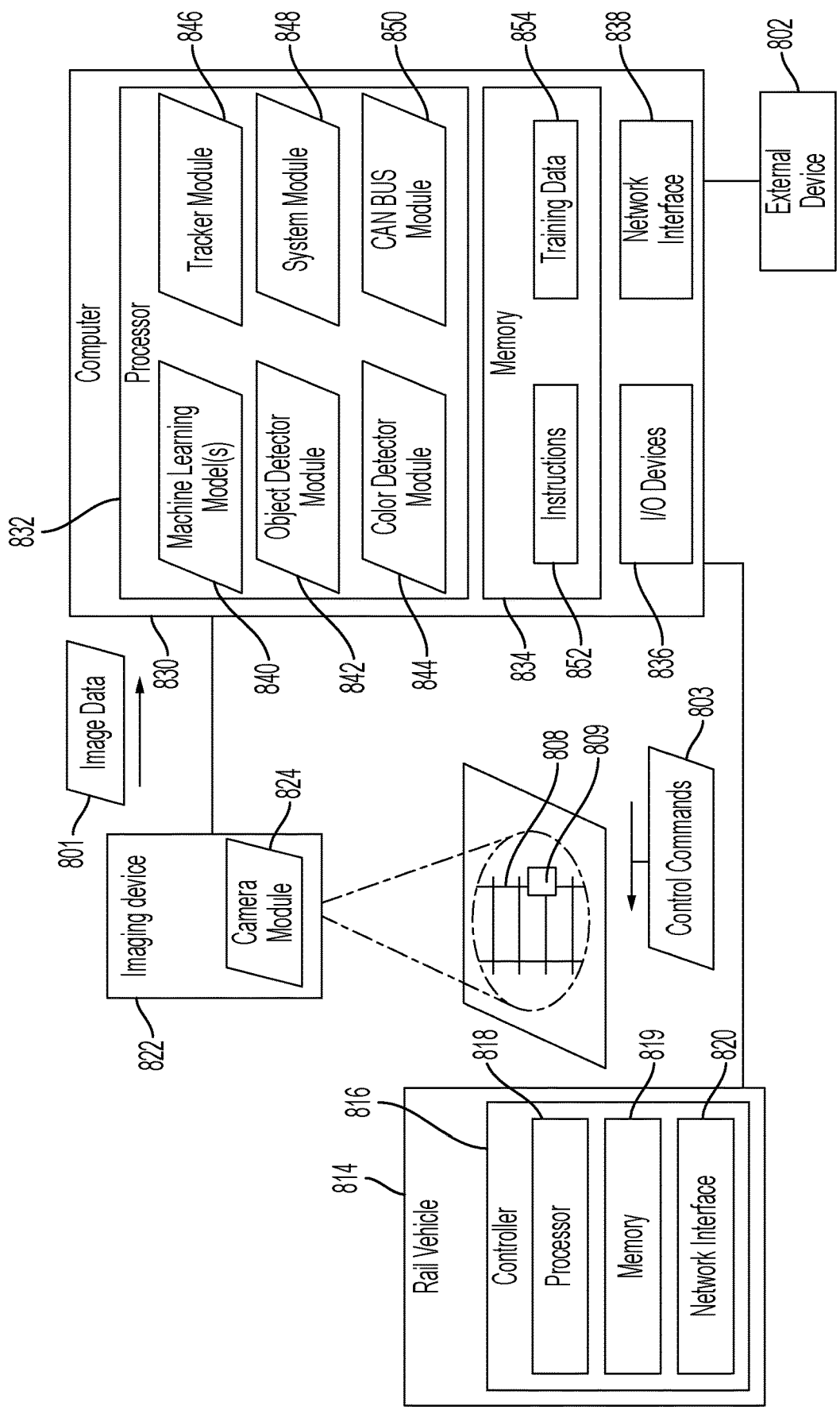
FIG. 8 depicts a block diagram of one other configuration of a railroad track feature detection system.

Referring now to FIG. 8, a schematic diagram of a railroad track feature detection system 810 is shown. Detection system 810 may provide, detection, positioning, measurement, prediction/forecast that facilitate automation, and track inspection and can be utilized for automated rail vehicle (i.e., drone vehicles) to enhance automation of the vehicles. As described herein, detection system 810 may provide detection, positioning, measurement, prediction/forecast occur in real-time (up to 0.01-second response) for the purpose of automating track work machines, which is not achievable via conventional rail systems. Detection system 810 includes an imaging device 822 and a computer 830. Computer 830 may be in communication with a controller 816 of a rail vehicle 814 and an external device 802. As shown in FIG. 8, imaging device 822, computer 830, and controller 816 are communicatively coupled to each other. Imaging device 822, computer 830, and controller 816 may include or correspond to camera 122, 422, 522; computer 130, 330, 430, 530; and controller 134, respectively.

Imaging device 822 may include a camera, such as a digital camera an active-pixel sensor (CMOS), charge-coupled device CCDs, LIDAR, 3D Vision camera, Quanta Image Sensor, or other image device. In some configurations, imaging device 822 include a camera module 824. Camera module 824 may include or correspond to camera module 620.

Computer 830 may include or correspond to a server, processor, AI module, GPU, computing system, etc. As depicted, computer 830 may include a processor 832 and a memory 834. In some configurations, computer 830 may include one or more I/O devices 836, and a network interface 838. Processor 832 may comprise various forms of processor-based systems in accordance with aspects described herein. For example, processor may include a general purpose computer system (e.g., a personal computer (PC), a server, a tablet device, etc.) and/or a special purpose processor platform (e.g., application specific integrated circuit (ASIC), system on a chip (SoC), neural network, etc.). In some implementations, processor 832 is a GPU accelerated Artificial Neural Network. In such configurations the processor may include an 8-Core ARM v8.2 CPU and a 512-Core GPU with 64 tensor cores configured to produce 32 trillion operations per second.

Processor 832 can include more than one processors, such as an image processor. Processor 832 may be configured to process image data and to perform object detection and/or recognition. Additionally, or alternatively, processor 832 may be configured to generate location information, such as control commands, for controller 816. Processor 832 may include the ML model(s) 840 (e.g., neural network), an object detector module 842, a color detector module 844, a tracker module 846, a system module 848, a CAN BUS module 850, or combination thereof. However, in other configurations, one or more of the modules can be included on separate processors of computer 830. ML model(s) 840, object detector module 842, color detector module 844, tracker module 846, system module 848, and CAN BUS module 850 can include or correspond to ML models 668; object detector module 632, color detector module 634, tracker module 642, system module 644, and CAN BUS module 650, respectively.

Memory 834 may include ROM devices, RAM devices, one or more HDDs, flash memory devices, SSDs, other devices configured to store data in a persistent or non-persistent state, or a combination of different memory devices. Memory 834 includes instructions 852 that, when executed by processor 832, cause the processor to perform operations according to aspects of the present disclosure. Memory 834 may also include training data 854, which may be used to train ML models 840. In some configurations training data 854 may include or correspond to training data 666.

I/O devices 836 may include a mouse, a keyboard, a display device, touchscreen, switch, button, or a combination thereof. Network interface 838 may be configured to communicatively couple the electronic device to one or more external devices, such as imaging device, controller, or both, via one or more wired or wireless networks. For example, computer may be configured to receive image data from imaging device, detect/recognize and object based on the image data, and output control commands to controller or other external device.

Controller 816 is configured to be coupled to or integrated with a rail vehicle 814 and may initiate one or more rail vehicle operations, such as maintenance actions or movement of the rail vehicle. Controller 816 includes one or more processors 818, a memory 819, and a network interface 820. In some configurations, controller 816 may be coupled to a work unit of rail vehicle 814 (e.g., working group), such as an anchor spreader, tamper, spike puller, or the like, that is configured to perform a maintenance task on the rail track. In some such configurations, controller 816 may generate one or more signals which cause the work unit to be actuated, moved, or otherwise operated to perform the maintenance task.

In some configurations, detection system 810 may be configured to identify one or more rail features 809 of a rail track 808 and perform a maintenance action based on the identification of the rail feature. In a non-limiting example, imaging device 822 is configured to capture an image of rail track 808, including rail track feature 809. In some configurations, the image may be captured according to parameters selected by camera module 824. Additionally, or alternatively, camera module 824 may be configured to perform one or more image processing techniques on the image, edit or convert the image data of the captured image, include additional information in the image, or combination thereof. The resulting image data 801 (either altered or unaltered by camera module 824) may be sent to computer 830.

Upon receiving image data 801, computer 830 (e.g., via processor 832) may process the image data to detect and identify rail feature 809 within the image data. In some configurations, ML models 840 are configured to identify rail feature 809 from a plurality of pre-selected rail features. For example, in configurations in which rail feature 809 is a color marker, color detector module 844 may detect and identify the rail feature. Alternatively, where in configurations in which rail feature 809 is a rail track component, object detector module 842 may detect and identify the rail feature. Object detector module 842 or color detector module 844 may communicate with tracker module 846 to determine a location of rail feature 809. For example, object detector module 842, color detector module 844, and tracker module 846 may cooperate to generate a rail map (e.g., as shown in FIGS. 10A-10D) with the location and identify of each rail feature (e.g., 809) within the captured images. Some or all of this information may be transmitted to an external device 802 (e.g., via CAN BUS Module 850, network interface 838, or the like).

In some configurations, processor 832 may determine rail feature 809 is above a failure threshold and is in need of repair or replacement. In some such configurations, computer 830 may initiate transmission of one or more control commands 803 to controller 816. Control commands 803 may include instructions or commands which cause controller 816 to initiate a maintenance operation. For example, control commands 803 may include information associated with a location of rail feature 809 and a maintenance action associated with the rail feature. Based on control command 803, control 816 may then rail vehicle 814 and a work unit coupled to the rail vehicle to rail feature 809 and actuate the work unit to repair the rail feature.

Figure 9A:
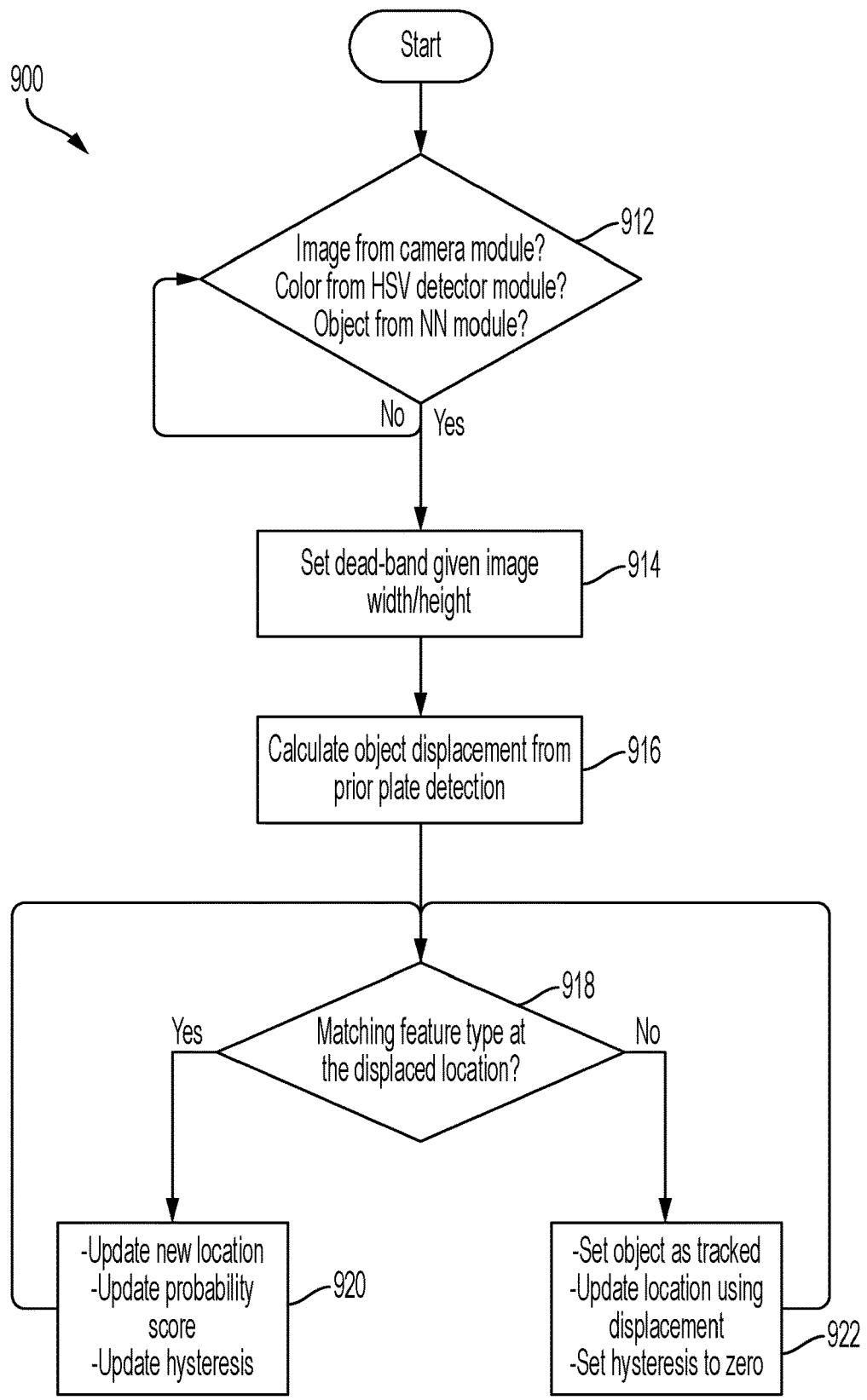
FIGS. 9A-9B depict flowcharts of an illustrative method implemented by a railroad track feature detection system.
Figure 9B:
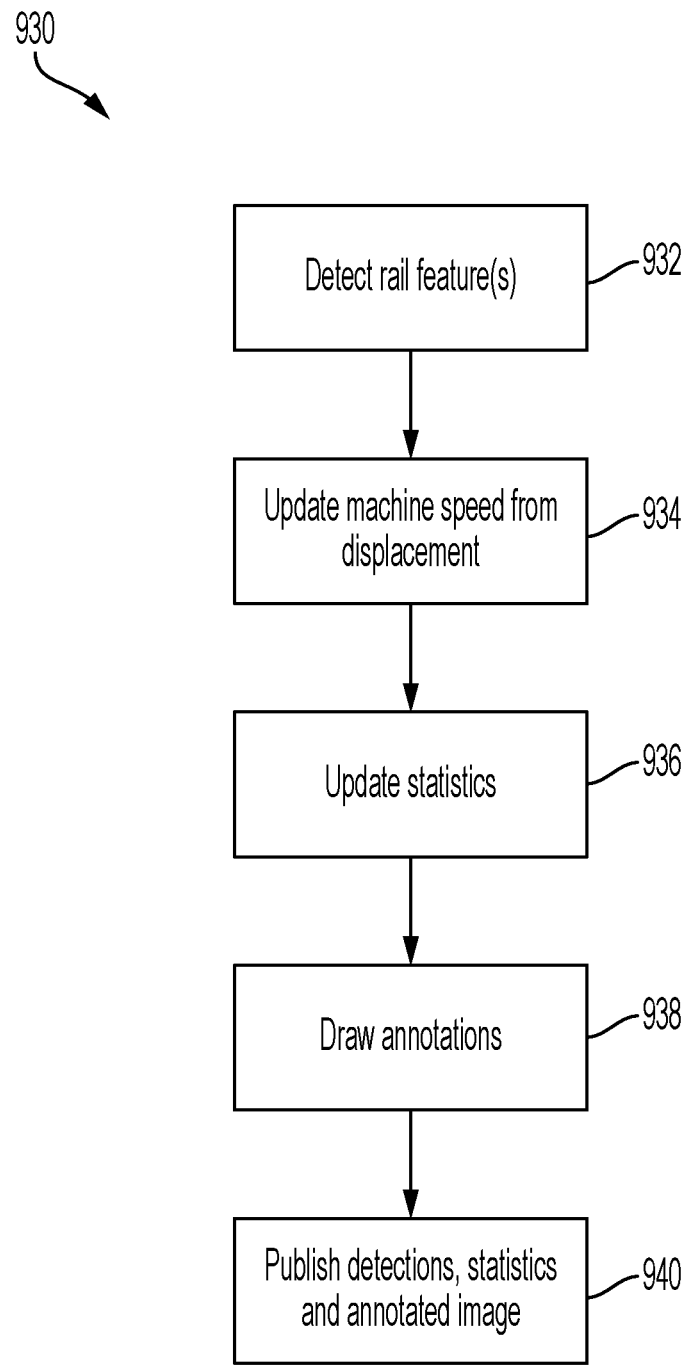
Figure 10A:
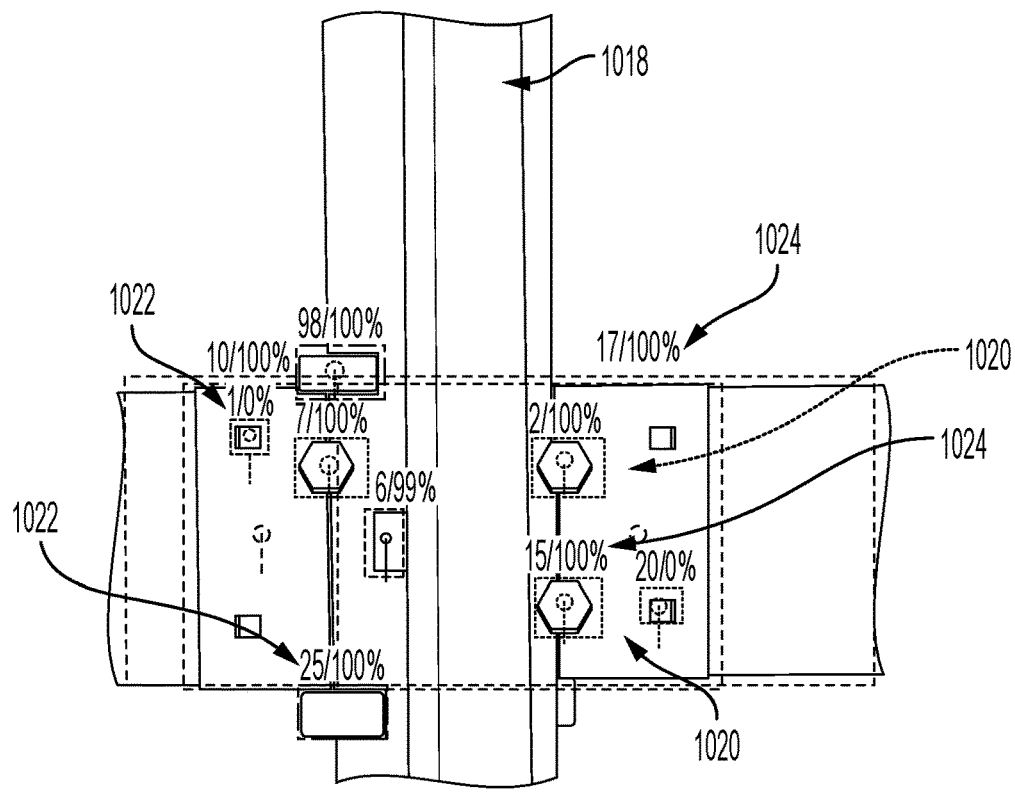
FIGS. 10A-10D depict annotated images that may be output by the railroad track feature detection system.
Figure 10B:
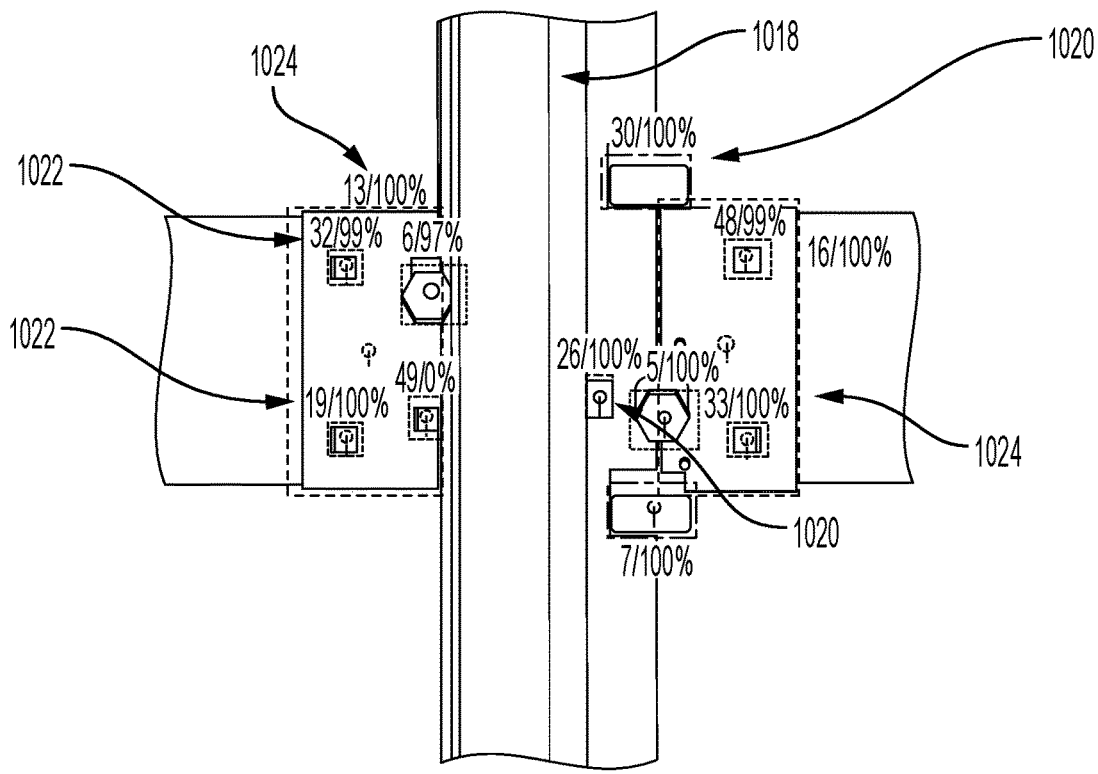
Figure 10C:
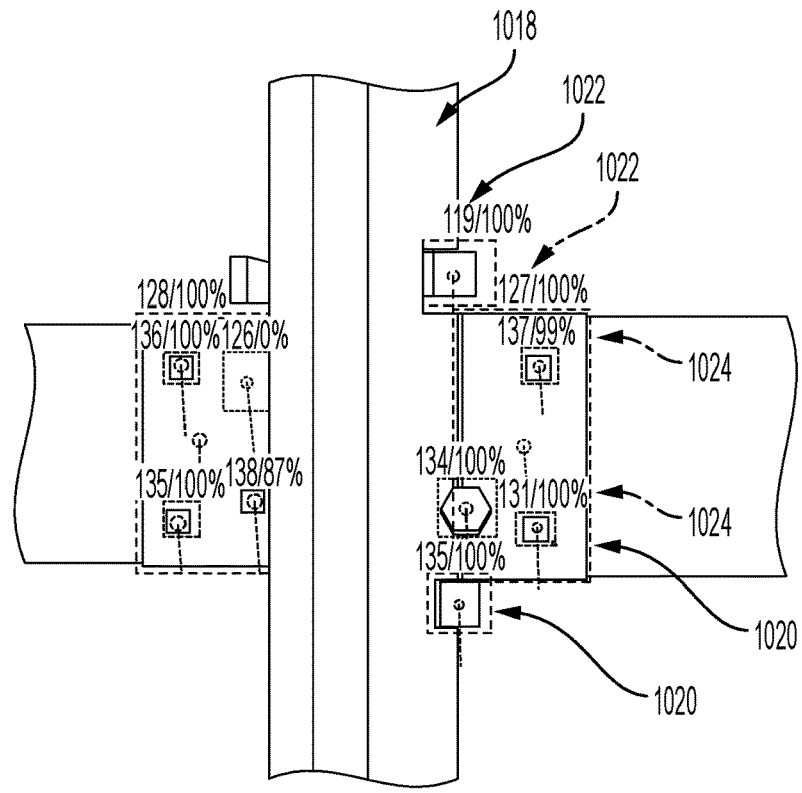
Figure 10D:
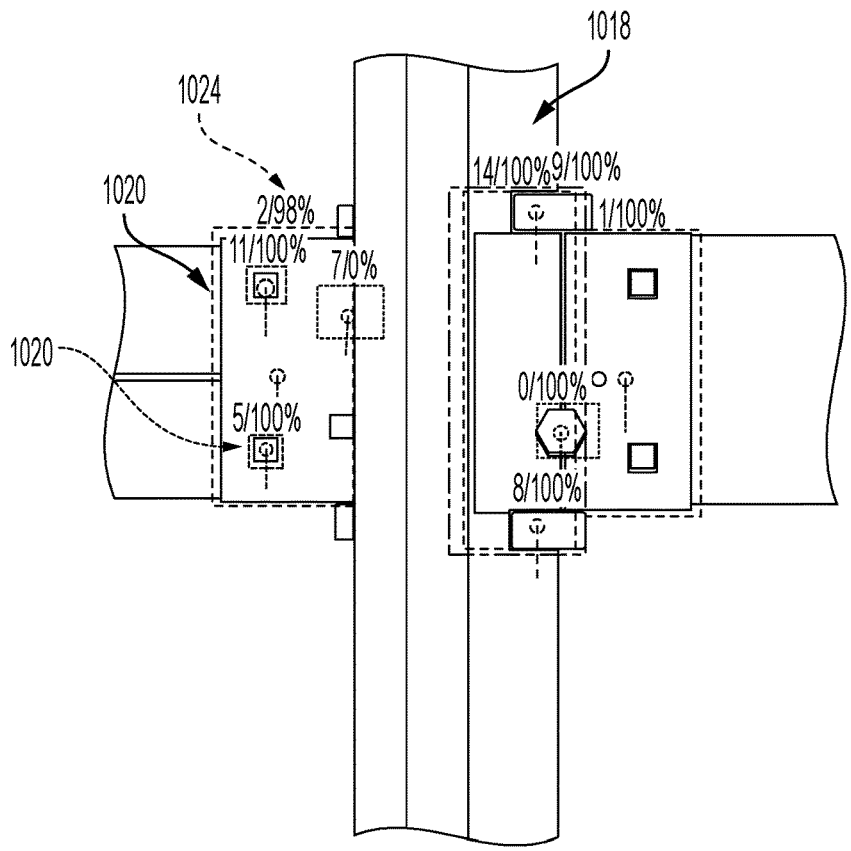

FIG. 9A-9C illustrates a flow chart of a method 900 implemented by a railroad track feature detection system (e.g., 110, 410, 510, 610, 810). Specifically, the flow chart illustrates one or more functions carried out by a tracker module (e.g., 642, 846) of the detection system.

At a first step 912 of method 900, a module (e.g., tracker module 642) receives rail information—including a first image, a color determination, an object determination, or combination thereof. In some configurations, first image may be received from a camera module (e.g., 620), color determination may be received from a color detector module (e.g., 634), object determination may be received from an object detection module (e.g., 632), or combination thereof. In the event the rail information is not received, the module may recheck after a certain period of time has expired or transmit a request for the rail information.

After receiving the rail information, the module then sets a dead-band of the first image based on a size (e.g., width/height) of the first image, at step 914. The module then compares the first image to a previous image and, based on the comparison, calculates object displacement from the previous image to the first image, at step 916. In some configurations, object displacement is calculated based on the length of a line $[d=\sqrt{((x\_2-x\_1)^2+(y\_2-y\_1)^2)}]$ given the center point of a classification from one frame (e.g., image) to the next. The object displacement may be calculated by a tracker module for the purpose of tracking an object. This allows the module to identify the same (reoccurring) rail feature in a new image. However, this is not the only method for tracking objects as other configurations may include calculating the object displacement based on a Kalman Filter, optical flow, external wheel encoder, or the like.

The calculated object displacement may be used to determine if a feature in the first image was present in the previous image, at 918. For example, the module may estimate a location of a first rail feature based on the calculated object displacement and the location of the first rail feature in the previous image. The estimated location is then compared with the first image. If the first image contains a rail feature of the same type as the first rail feature, then the rail feature is determined to be the first rail feature. Based on the first rail feature being present at the estimated location, the module proceeds to step 920. Method 900 may include setting the first rail feature as detected and updates the information of the rail feature (e.g., location, probability/confidence score, hysteresis, etc.), at 920.

Alternatively, if first rail feature is determined not to be in the first image (e.g., no rail feature at the estimated location), the module sets the first rail feature as tracked and stores the location information as read by the previous image, at 922. In some configurations, the module can store the last confirmed location and k the first rail feature relative to newly imaged rail features by updating the displacement using the object displacement compared to the stored location information. In some configurations, module may also set hysteresis to zero after the first rail feature is stored, at step 922. Method 900 may then be repeated for each new image received by the module.

Now referring to FIG. 9B, a flow diagram of an example of a method for identifying rail features is shown as a method 930. Method 930 may be a continuation of method 900 (e.g., performed after step 918 or may be performed apart from method 900. As shown, at step 932 the system or module may detect one or more rail feature as described herein. In some configurations, the detected rail features may be identified as corresponding to a left or right side of a rail (e.g., 118, 818). For example, the module may determine whether a detected plate is a left plate or a right plate in relation to the rail. Additionally, or alternatively, the module determines which portion of the plate corresponds to the inside or outside of the rail track. In other words, the right side of the plate of the right rail track corresponds to an outside portion while the right side of the plate of the left rail track corresponds to an inside portion. Based on this information, the module may then determine the dimensions and relevant features of the plate in relation to the camera. This information may be used to update the location and feature identification (e.g., filter out) previously provided to the tracker module. The module may apply rules to determine any inconsistencies between the modules, determine required maintenance procedures, or other determinations as described herein.

In some configurations, step 932 may include determining a condition associated with the rail features, such as a failure condition. As an illustrative example, the module may detect a rail anchor and determine whether the anchor needs to be spread and/or squeezed. In some such configurations, a computer (e.g., 130, 330, 430, 530, 830) may be configured to control a controller (e.g., 134, 816) to perform operations based on a combination of features detected. For example, the computer may identify a specific combination (ties with anchors, ties without anchors, ties with anchors and no spikes, ties with paint-dot and anchors, etc.) and based on the identified features in the image, and/or the type of work unit, the computer may operate the work unit to perform a specific function (e.g., pull spikes, spread anchors, spike a new plate, squeeze the anchors, etc.).

As illustrated, the module may update the rail vehicle speed based on the calculated displacement, at step 934. In some configurations, the updated speed is a passive measurement used in determining the object displacement in subsequent images. However, in other configurations, tracker module (e.g., 642, 846) may transmit one or more commands to a controller (e.g., 134, 816) of the rail vehicle to adjust a speed of the rail vehicle. For example, if the tracker module determines the system is maintaining location accuracy above a predetermined threshold, then the module may increase the speed of the rail vehicle. On the other hand, if the accuracy is below a desired value (e.g., within ¼ of an inch), then the module may control the rail vehicle to decrease speeds to increase the accuracy.

Method 930 (e.g., via a module) may then update any stored or output information based on the performed functions, at step 936. In some configurations, the stored information may be location information of the rail features (e.g., relative distances between all identified rail features). Additionally, or alternatively, the module may be configured to update an identification of a rail feature based on a verification of the feature, such as a verification via subsequent images of the feature.

The module may then draw annotations based on the updated information, at 938. For example, the module may produce a bounded rectangular box overlapping the identified feature in the first image. The bounded boxes may be produced for each rail feature and can be color coded, so that each type of feature is easily recognizable. The detections, updated information, and annotated images may then be output (e.g., published) to one or more external devices, at step 940.

Referring now to, FIGS. 10A-10D four annotated images produced by a railroad track feature detection are shown. Each annotated image may include a portion of rail track 1018 including a plurality of rail features. As depicted, the detection system may include one or more annotations, such as a boundary 1020, a feature identifier 1022, a confidence score 1024, or combination thereof. Boundary 1020 may correspond to a region of the image associated with each identified rail feature. Feature identifier 1022 may correspond to an alphabetical, numerical, or other value that corresponds to a pre-determined rail feature. Confidence score 1024 may correspond to a numerical value, or percentage, associated with the accuracy that the identified rail feature. For example, a higher confidence score may indicate it is more likely that the identified rail feature is correctly identified. Using the above described railroad track feature detection system (e.g., 100, 410, 510, 610, 810), detection of rail features was made possible. For example, in certain configurations, using a CNN model with a small training set, the detection of anchors, tie plates, plate spikes, and plate holes was performed at 92%, 90%, 83%, and 79% accuracy, respectively. In another configurations, the same CNN model with a larger training set was able to detect anchors, tie plates, plate spikes, and plate holes was performed at 96%, 98%, 97%, and 94% accuracy, respectively. In yet another configuration, a Gaussian path aggregation network model and even larger training set was able to detect anchors, tie plates, plate spikes, and plate holes was performed at 99.9%, 99.9%, 99%, and 98% accuracy, respectively. Thus, system may be trained or configured to detect rail features at greater than 98% accuracy or, alternatively, to detect the rail features at a lesser accuracy while utilizing less computing power.

The invention claimed is:

1. A rail vehicle comprising:
a frame coupled to a plurality of rail wheels configured to move along a rail track; and
a railroad track feature detection system coupled to the frame, the feature detection system comprising:
  a camera coupled to the frame and positioned such that the camera is configured to capture a plurality of images of a rail track as the rail vehicle moves along the rail track; and
  a computer having: at least one memory comprising instructions; and at least one processor configured to execute the instructions, wherein the instructions cause the at least one processor to:
    receive the plurality of images, and for each of the images:
      assign a location identifier;
      detect one or more rail features;
      identify the one or more rail features as a relevant rail feature from a dataset of predetermined rail features; and
      assign a feature identifier to each identified rail feature;
    based on the location identifier and the feature identifier:
      determine a geographical location of the one or rail more features; and
      track the one or more rail features;
    assign a first location identifier to a first image of the plurality of images;
    identify, in the first image, the one or more rail features;
    assign a second location identifier to a second image of the plurality of images;
    compare the first location identifier with the second location identifiter to determine a first displacement distance between the identified rail features in the first image;
    based on the first displacement distance, determine if one or more rail features in the second image correspond to one of the one or more identified rail features in the first image; and
    based on the determintion that:
      a first subset of the one or more rail features in the second image correspond to at least one of the one or more identified rail features in the first image, setting the first subset as detected rail features and re-identifying the first subset of the one or more rail features; and
      a second subset of the one or more features in the second image does not correspond to at least one of the one or more identified rail features in the first image, setting the second subset as detected rail features and identifying, in the first image, the second subset of the one or more rail features.

2. The rail vehicle of claim 1, wherein the instructions include a convolutional neural network.

3. The rail vehicle of claim 1, wherein:
the processor is configured to identify the one or more rail features in real-time; and
for the first image of the plurality of images, the processor is configured to:
  classify a first set of one or more ojbects in the first image as one of the one or more rail features;

classify a second set of the one or more objects in the first image as extraneous features; and filter out the extraneous features.

4. The rail vehicle of claim 1, wherein the processor is configured to:

determine if one of the rail features is missing or displaced at a first rail plate; and based on the determination that one of the rail features is missing or displaced at the first rail plate, generate an alert signal.

5. The rail vehicle of claim 4, further comprising:

a work unit coupled to the frame and configured to perform one or more railroad maintenance or operation functions; and wherein based on the alert signal, the processor is configured to control the work unit to perform a maintenance function at the first rail plate.

6. The rail vehicle of claim 1, further comprising:

a second camera;

a third light source; and a fourth light source; and wherein:

the frame includes a second bracket assembly;

the third light source and fourth light source disposed on the second bracket assembly such that light emitted from the third and fourth light source is directed to opposing sides of a second rail of the rail track; and the second camera is disposed between the third light source and the fourth light source and configured to take images of the second rail.

7. A railroad track feature detection system comprising:

an imaging device configured to be coupled to a frame of a rail vehicle and positioned such that the imaging device is configured to capture a plurality of images of a rail track as the rail vehicle moves along the rail track; and a computer having:

at least one memory comprising instructions, at least a portion of the instructions configured as a neural network; and at least one processor configured to execute the instructions, wherein the instructions cause the at least one processor to perform one or more operations in real-time;

wherein the one or more operations include:

receiving the plurality of images, and for each of the images:

assigning a location identifier; and identifying one or more rail features that correspond to one of a plurality of predetermined rail features; and determining a location of each of the one or more identified rail features;

assigning a first location identifier to a first image of the plurality of images, identifying, in the first image, the one or more rail features;

assigning a second location identifier to a second image of the plurality of images, comparing the first location identifier with the second location identifier to determine a first displacement distance between the identified rail features in the first image;

based on the first displacement distance, determining if one or more rail features in the second image correspond to one of the one or more identified rail features in the first image;

based on the determintion that:

a first subset of the one or more rail features in the second image correspond to at least one of the one or more identified rail features in the first image, setting the first subset as detected rail features and re-identifying the first subset of the one or more rail features; and a second subset of the one or more rail features in the second image does not correspond to at least one of the one or more identified rail features in the first image, setting the second subset as detected rail features and identifying, in the first image, the second subset of the one or more rail features.

8. The system of claim 7, further comprising:

assigning a third location identifier to a third image of the plurality of images, comparing the third location identifier to the first and second location identifiers to determine a second displacement distance;

based on the second displacement distance, determining if the one or more rail features in the third image corresponds to one of the rail features of the first and second subsets; and based on the determination that:

the first subset of the one or more rail features is not contained within the third image, setting the first subset of rail features as tracked rail features;

a third subset of the one or more rail features in the third image corresponds to at least one of the one or more identified rail features in the first image or the second image, re-identifying the third subset of the one or more rail features; and a fourth subset of the one or more rail features in the third image does not correspond to at least one of the one or more identified rail features in the first and second images, identifying, in the third image, the fourth subset of the one or more rail features.

9. The system of claim 7, wherein identifying one or more rail features includes identifying a rail plate, a hole defined by the rail plate, a colored marker disposed on a portion of the rail, an anchor, a work tie, and/or a joint bar.

10. The system of claim 7, wherein the computer includes an object detector module, a color detector module, and a tracker module.

11. The system of claim 10, wherein the object detector module is configured to:

receive the plurality of images;

detect, in real-time, one or more objects in a latest image of the plurality of images;

classify a first set of the one or more objects as one of the one or more rail features;

classify a second set of the one or more objects as extraneous features; and output the one or more rail features.

12. The system of claim 11, wherein the object detector module is configured as a convolutional neural network.

13. A railroad track feature detection system comprising:

an imaging device configured to be coupled to a frame of a rail vehicle and postioned such that the imaging device is configured to capture a plurality of images of a rail track as the rail vehicle moves along the rail track; and a computer having:
- at least one memory comprising instuctions, at least a portion of the instructions configured as a neural network; and
- at least one processor configured to execute the instructions, wherein the instructions cause the at least one processor to perform one or more operation in real-time;

wherein the one or more operations include:
- receiving the plurality of images, and for each of the images:
  - assigning a location identifier; and
  - identifying one or more rail features that correspond to one of a plurality of predetermined rail features; and
  - determining a location of each of the one or more identified rail features wherein the computer includes an object detector module, a color detector module, and a tracker module; and wherein the color detector module is configured to:
- receive the plurality of images;
- determine a hue/saturation/value (HSV) of a plurality of pixels within a latest image of the plurality of images;
- detect, in real-time, one or more color markers in the latest image; and
- output the one or more color markers.

14. The system of claim 13, wherein the tracker module is configured to:
- receive the one or more rail features from the object detector module;
- receive the one or more color markers from the color detector module;
- assign a feature ID to each of the one or more rail features and the one or more color markers; and
- track a location of each of the one or more rail features and the one or more color markers.

15. The system of claim 14, wherein the tracker module is configured to:
- generate a map of the rail track including one or more rail features, based on the location of each of the one or more rail features and the one or more color markers; and
- transmit the map to an external source.

16. The system of claim 14, wherein the feature ID includes location information, a feature identifier that corresponds to a predetermined rail feature, and a confidence score.

17. The system of claim 14, wherein for each image of the plurality of images, the tracker module is configured to:
- record the feature IDs associated with the one or more rail features and the one or more color markers within the image;
- update an output list to include the feature IDs of a most recent image; and
- annotate the image to include:
  - a frame around each of the one or more rail features and the one or more color markers within the image;
  - a ID number associated with the feature ID of the one or more rail features and the one or more color markers within the image; and
  - a confidence score associated with the feature ID of the one or more rail features and the one or more color markers within the image.

18. The system of claim 17, wherein the tracker module is configured to transmit the annotated image to an external device.

19. A method of tracking one or more rail features, the method comprising:
- receiving a first image from a camera module;
- detecting one or more first rail features in the first image;
- identifying the one or more first rail features;
- receiving a second image from the camera module;
- calculating a displacement distance associated with the first and second images;
- detecting one or more second rail features in the second image;
- based on the displacement distance, identifying a first subset of the one or more second rail features that correspond to one of the one or more first rail features;
- re-identifying the first subset of the one or more second rail features; and
- identifying a second subset of the one or more second rail features that do not correspond to one of the one or more first rail features;
- identifying a first subset of the one or more first rail features that are not included in the second image; and
- setting the first subset of the one or more first rail features as tracked feature and transmitting feature data of the tracked features to a display unit.

* * * * *

UNITED STATES PATENT AND TRADEMARK OFFICE
CERTIFICATE OF CORRECTION

PATENT NO. : 11,893,727 B2
APPLICATION NO. : 17/508984
DATED : February 6, 2024
INVENTOR(S) : Javier Fernandez It is certified that error appears in the above-identified patent and that said Letters Patent is hereby corrected as shown below:

In the Claims

Claim 1, Column 24, Line 37 - delete "identifiter" and insert --identifier--

Claim 1, Column 24, Line 44 - delete "determintion" and insert --determination--

Claim 3, Column 24, Line 66 - delete "ojbects" and insert --objects--

Claim 7, Column 26, Line 3 - delete "determintion" and insert --determination--

Claim 13, Column 26, Line 64 - delete "postioned" and insert --positioned--

Claim 13, Column 27, Line 2 - delete "instuctions" and insert --instructions--

Claim 13, Column 27, Line 7 - delete "operation" and insert --operations--

Signed and Sealed this
Third Day of September, 2024

Katherine Kelly Vidal
*Director of the United States Patent and Trademark Office*